(12) United States Patent
Behzadfar et al.

(10) Patent No.: US 12,246,518 B2
(45) Date of Patent: Mar. 11, 2025

(54) ADDITIVE FREE FABRICATION OF POLYMERIC COMPOSITES WITH DELAYED AND REDUCED DRIPPING

(71) Applicant: Ehsan Behzadfar, Toronto (CA)

(72) Inventors: Ehsan Behzadfar, Toronto (CA); Christopher W. Macosko, Minneapolis, MN (US); Frank S. Bates, Minneapolis, MN (US); Alex M. Jordan, Menomonie, WI (US); Kyungtae Kim, Minneapolis, MN (US)

(73) Assignee: Ehsan Behzadfar, Toronto (CA)

( * ) Notice: Subject to any disclaimer, the term of this patent is extended or adjusted under 35 U.S.C. 154(b) by 0 days.

(21) Appl. No.: 17/681,044

(22) Filed: Feb. 25, 2022

(65) Prior Publication Data

US 2022/0274386 A1    Sep. 1, 2022

Related U.S. Application Data

(60) Provisional application No. 63/154,374, filed on Feb. 26, 2021.

(51) Int. Cl.
| | |
|---|---|
| *B32B 27/08* | (2006.01) |
| *B29C 48/21* | (2019.01) |
| *B29C 48/30* | (2019.01) |
| *B32B 27/32* | (2006.01) |

(Continued)

(52) U.S. Cl.
CPC .............. *B32B 27/08* (2013.01); *B29C 48/21* (2019.02); *B29C 48/304* (2019.02); *B32B 27/32* (2013.01); *B29K 2023/06* (2013.01); *B29K 2023/12* (2013.01); *B29L 2009/00* (2013.01); *B32B 2250/04* (2013.01); *B32B 2250/05* (2013.01); *B32B 2250/42* (2013.01); *Y10T 428/24967* (2015.01)

(58) Field of Classification Search
CPC ..... B32B 27/08; B32B 27/32; B32B 2250/04; B32B 2250/05; Y10T 428/24967
See application file for complete search history.

(56) References Cited

U.S. PATENT DOCUMENTS

| 8,986,823 B1 * | 3/2015 | Montsinger ........... B32B 37/153 428/483 |
| 2010/0215879 A1 * | 8/2010 | Dooley ................... B32B 1/08 264/250 |
| 2016/0144605 A1 * | 5/2016 | Jenkins .................. B32B 27/32 428/339 |

OTHER PUBLICATIONS

[NPL-1] "Lumicene® M1835"; UL Prospector; Apr. 2, 2024; <https://www.ulprospector.com/plastics/en/datasheet/228493/lumicene-m-1835-cast-film>. (Year: 2024).*

(Continued)

*Primary Examiner* — Maria V Ewald
*Assistant Examiner* — Donald M Flores, Jr.
(74) *Attorney, Agent, or Firm* — Smart & Biggar LP

(57) ABSTRACT

Multilayer composite materials are described herein. The multilayer composite materials have a first layer comprising a first polymer and a second layer comprising a second polymer. The first layer and the second layer abut each other. The first layer and the second layer each have a thickness in a range of about 10 nm to about 1 mm. The first layer and the second layer are arranged to provide for the multilayer composite material to have reduced dripping and a delayed first dripping time as they undergo a combustion process relative to a single layer material having a same thickness as a thickness of the multilayer composite materials.

20 Claims, 13 Drawing Sheets

(51) Int. Cl.
   B29K 23/00       (2006.01)
   B29L 9/00        (2006.01)

(56) References Cited

OTHER PUBLICATIONS

Schartel et al. Recommendations on the Scientific Approach to Polymer Flame Retardancy: Part 2—Concepts. Orig. Artic. J. Fire Sci., vol. 35(1), published 2017, pp. 3-20.
Stoliarov et al. Prediction of the Burning Rates of Non-Charring Polymers. Combust and Flame 2009, vol. 156(5), published Dec. 6, 2008, pp. 1068-1083.
Leventon. Prediction of upward flame spread over polymers. University of Maryland, published 2016.
Matzen et al. Influence of Flame Retardants on the Melt Dripping Behaviour of Thermoplastic Polymers. Materials (Basel), vol. 8, published Aug. 27, 2015, pp. 5621-5646.
Przystas et al. Some Key Factors Influencing the Flame Retardancy of EDA-DOPO Containing Flexible Polyurethane Foams. Polymers (Basel), vol. 10 (1115), published Oct. 9, 2018, pp. 1-15.
Kong et al. In Situ Armoring: A Robust, High-Wettability, and Fire-Resistant Hybrid Separator for Advanced and Safe Batteries. ACS Applied Materials & Interfaces 2019, vol. 11(3), published Dec. 13, 2018, pp. 2978-2988.
Illeperuma et al. Fire-Resistant Hydrogel-Fabric Laminates: A Simple Concept that May Save Lives. ACS Applied Material & Interfaces 2016, vol. 8(3), published Dec. 30, 2015, pp. 2071-2077.
Lu et al. Starch-based completely biodegradable polymer materials. Express Polymer Letter, vol. 3(6), published Mar. 30, 2009, pp. 366-375.
Karamikamkar et al. In Situ Interface Design in Graphene-Embedded Polymeric Silica Aerogel with Organic/Inorganic Hybridization. ACS Applied Materials & Interfaces, vol. 12, published Apr. 30, 2020, pp. 26635-26648.
Kandola et al. Quantification of polymer degradation during melt dripping of thermoplastic polymers. Polymer Degradation and Stability, vol. 106, published 2014, pp. 16-25.
Emergency and Emergency Evacuation Duties. Code of Federal Regulations, Title 14, Pt. 121.397. U.S. Government Printing Office, 1985.
Chatterjee et al. Fire-Retardant, Self-Extinguishing Inorganic/Polymer Composite Memory Foams. ACS Applied Materials & Interfaces, vol. 9(51), published Dec. 5, 2017, pp. 44864-44872.
Naik et al. Salen Complexes as Fire Protective Agents for Thermoplastic Polyurethane: Deep Electron Paramagnetic Resonance Spectroscopy Investigation. ACS Applied Materials & Interfaces, vol. 10(29), published Jun. 29, 2018, pp. 24860-24875.
Chu et al. Hierarchical Structure: An effective Strategy to Enhance the Mechanical Performance and Fire Safety of Unsaturated Polyester Resin. ACS Applied Materials & Interfaces, vol. 11, published Jul. 24, 2019, pp. 29436-29447.
Wei et al. Novel Core—Shell Hybrid Nanosphere towards the Mechanical Enhancement and Fire Retardance of Polycarbonate. ACS Applied Materials & Interfaces, vol. 10(33), published Jul. 27, 2018, pp. 28036-28050.
Shang et al. Novel Polymer Aerogel toward High Dimensional Stability, Mechanical Property, and Fire Safety. ACS Applied Materials & Interfaces, vol. 9(27), published Jun. 16, 2017, pp. 22985-22993.
Hou et al. DOPO—Modified Two-Dimensional Co-Based Metal-Organic Framework: Preparation and Application for Enhancing Fire Safety of Poly(lactic acid). ACS Applied Materials & Interfaces, vol. 10(9), published Feb. 13, 2018, pp. 8274-8286.
Amran Bin Md Ali et al. Morphology Development of Polytetrafluoroethylene in a Polypropylene Melt. Pure and Applied Chemistry, vol. 83(10), published Nov.-Dec. 2011, pp. 1819-1830.
Huang et al. In-Situ Fibrillated Polytetrafluoroethylene (PTFE) in Thermoplastic Polyurethane (TPU) via Melt Blending: Effect on Rheological Behavior, Mechanical Properties, and Microcellular Foamability. Polymer, vol. 134, published 2018, pp. 263-274.
Zhao et al. Development of High Thermal Insulation Polypropylene Foams Blown in Injection Molding with Mold Opening. European Polymer Journal, vol. 98, published 2018, pp. 1-10.
Awaja and Pavel. Recycling of PET. European Polymer Journal, vol. 41(7), published Mar. 16, 2005, pp. 1453-1477.
Cobian-Iñiguez et al. On the Use of Semi-Empirical Flame Models for Spreading Chaparral Crown Fire. Frontiers in Mechanical Engineering, vol. 5, published Aug. 21, 2019, pp. 1-13.
Younis. Evaluation of the Flammability and Thermal Properties of a New Flame Retardant Coating Applied on Polyester Fabric. Egyptian Journal of Petroleum, vol. 25(2), published 2016, pp. 161-169.
Shimizu et al. Polymer fume fever. BMJ Case Reports, published Dec. 10, 2012.
Levchik and Weil. Flame Retardants in Commercial Use or in Advanced Development in Polycarbonates and Polycarbonate Blends. Journal of Fire Sciences, vol. 24, published Mar. 2006, pp. 137-151.
Dhanumalayan and Joshi. Performance Properties and Applications of Polytetrafluoroethylene (PTFE)—a Review. Advanced Composites and Hybrid Materials, vol. 1, published Feb. 23, 2018, pp. 247-268.
Ghanbari et al. Morphological and Rheological Properties of PET/Clay Nanocomposites. Rheologica Acta, vol. 52(1), published Jan. 3, 2013, pp. 59-74.
Kashiwagi et al. Relation between the Viscoelastic and Flammability Properties of Polymer Nanocomposites. Polymer, vol. 49(20), published Aug. 3, 2008, pp. 4358-4368.
Liu et al. Effect of Montmorillonite Dispersion on Flammability Properties of Poly(Styrene-Co-Acrylonitrile) Nanocomposites. Polymer, vol. 52(14), published May 7, 2011, pp. 3092-3103.
Ghanbari et al. Properties of Talc Filled Reactor-Made Thermoplastic Polyolefin Composites. Journal Polymer Research, vol. 26(10), published Sep. 4, 2019, pp. 1-27.
Gholami et al. Morphological, Interfacial and Rheological Properties in Multilayer Polymers: A Review. Polymer, vol. 208, published Aug. 27, 2020, pp. 1-17.
Zheng and Suh. Strategies to Reduce the Global Carbon Footprint of Plastics. Nature Climate Change, vol. 9(5), published May 2019, pp. 374-378.
Jordan et al. Role of Crystallization on Polyolefin Interfaces: An Improved Outlook for Polyolefin Blends. Macromolecules 2018, vol. 51(7), published Mar. 20, 2018, pp. 2506-2516.
Jordan et al. Rheology of Polymer Multilayers: Slip in Shear, Hardening in Extension. Journal of Rheology, vol. 63(5), published Jul. 25, 2019, pp. 751-761.
Beyler et al. A Computer Model of Upward Flame Spread on Vertical Surfaces. Fire Safety Science—Proceeding of the Fifth International Symposium, published 1997, pp. 297-308.
De Ris. Spread of a Laminar Diffusion Flame. Symposium on Combustion, vol. 12(1), published 1969, pp. 241-252.
Dixon et al. Decomposition Rates of Organic Free Radical Initiators. Polymer Handbook (4th Edition); John Wiley & Sons, published 2005, pp. 1-43.
Johnston et al. Pulmonary Effects Induced by Ultrafine PTFE Particles. Toxicology and Applied Pharmacology, vol. 168, published Aug. 14, 2000, pp. 208-215.
Wang et al. Tribological Behaviors of Amino Functionalized Graphene Reinforced PTFE Composite. Institution of Mechanical Engineers Part J; Journal of Engineering Tribology, vol. 232(11), published 2018, pp. 1428-1436.
Kempel et al. Modelling the Vertical UL 94 Test: Competition and Collaboration between Melt Dripping, Gasification and Combustion. Fire and Materials, vol. 39, published 2015, pp. 570-584.
López-Barron and Macosko. Rheological and Morphological Study of Cocontinuous Polymer Blends during Coarsening. Journal of Rheology, vol. 56, published Jul. 30, 2012, pp. 1315-1334.
Christiansen et al. Coarsening and Aging of Lattice Polymers: Influence of Bond Fluctuations. The Journal of Chemical Physics, vol. 147, published Sep. 1, 2017, pp. 094902-1-094902-12.

(56) References Cited

OTHER PUBLICATIONS

Behzadfar et al. Extrudate Swell of HDPE Melts: I. Experimental. Journal of Non-Newtonian Fluid Mechanics (2015), vol. 225, published Aug. 12, 2015, pp. 86-93.

Konaganti et al. Extrudate Swell of High Density Polyethylenes in Slit (Flat) Dies. International Polymer Processing, vol. 31(2), published May 10, 2016, pp. 262-272.

Konaganti et al. Transient Swell of a High Density Polyethylene Using Adjustable Gap Slit Die. International Polymer Processing, vol. 32(5), published Nov. 29, 2017, pp. 574-581.

López-Barron and Macosko. A New Model for the Coarsening of Cocontinuous Morphologies. Soft Matter, vol. 6(12), published Jun. 21, 2010, pp. 2559-2850.

Kouini and Serier. Combustion Behavior of Polypropylene/Polyamide66/Clay Nanocomposites. Journal of Vinyl & Additive Technology—2017, vol. 23, published 2017, pp. E68-E71.

Younis. Flammability Properties of Polypropylene Containing Montmorillonite and Some of Silicon Compounds. Egyptian Journal of Petroleum, vol. 26(1), published Mar. 2, 2016, pp. 1-7.

UL 94, Standard for Safety for Tests for Flammability of Plastic Materials for Parts in Devices and Appliances; 2013.

Feng et al. Suppressing Phase Coarsening in Immiscible Polymer Blends Using Nano-Silica Particles Located at the Interface. RSC Advances, vol. 5, published Aug. 25, 2015, pp. 74295-74303.

Sundararaj and Macosko. Drop Breakup and Coalescence in Polymer Blends: The Effects of Concentration and Compatibilization. Macromolecules 1995, vol. 28, pp. 2647-2657.

Taylor. The Formation of Emulsions in Definable Fields of Flow. Proc. Roy. Soc. A Math. Phys. Eng. Sci., vol. 146(858), published May 9, 1934, pp. 501-523.

Taylor. The Viscosity of a Fluid Containing Small Drops of Another Fluid. Proc. Roy. Soc. A Math. Phys. Eng. Sci., vol. 138(834), published Jun. 30, 1932, pp. 41-48.

\* cited by examiner

ADDITIVE FREE FABRICATION OF POLYMERIC COMPOSITES WITH DELAYED AND REDUCED DRIPPING

CROSS-REFERENCE

This application claims the benefit of U.S. Provisional Patent Application No. 63/154,374 titled "Additive Free Fabrication of Polymeric Composites with Delayed and Reduced Dripping" filed on Feb. 26, 2021, the entire contents of which are incorporated herein by reference.

FIELD

This disclosure relates generally to polymer composite materials, and more specifically to multilayer polymer composite materials with delayed and reduced dripping.

BACKGROUND

Performance of polymers in the case of a fire is a critical factor for consumer safety in buildings and aircraft, and with protective layers used in construction and packaging industries.[1-9] This performance is dependent on the behavior of the polymer at different zones in the combustion process, as illustrated, for example, in FIG. 1A. These zones include the local degradation, combustion, and char formation zones. During combustion, polymeric materials melt and flow down to the local degradation zone where pyrolysis occurs and flammable volatiles are formed, which fuel the fire. In most polymers, combustion is accompanied by the formation of a char layer and the release of toxic fumes.

To evaluate the response of materials in a combustion process, two main phenomena are generally considered for investigation: dripping and flame spread rates (hereafter referred to as burning rates).[5,19] Dripping indicates the spread of the fire through the detachment of burning parts of the material while burning rates refer to the rate of flame advancement throughout the material. As shown in FIG. 1B, dripping for polymers takes place due to the capillary breakup of the melt stream and, if ignited, can carry burning material beyond the sample.

Dripping is important for the fire safety of products from two perspectives: (i) first drip time, which is the time required for the first drop to be disengaged from the fuel bed, and (ii) the overall number of drips. For example, US federal regulations dictate that all modern airliners capable of carrying more than 44 passengers must be able to be fully evacuated in less than 90 seconds.[11] Any improvement to the first drip time can be important as it lengthens the critical period at the start of a fire to sound the alarm, access fire extinguishers, and let more vulnerable people evacuate the fire area.

Burning rates for solid materials are defined as the rate of flame advancement over a solid fuel bed. FIG. 1B depicts a model that describes the surface flame advancement process.[3] In this representation, $h_0$ is the thickness of the material, $L_p$ is the pyrolysis height, $\dot{q}_f$ is the net heat flux, $\delta_f$ is the characteristic length of radiation, $L_f$ is the flame height, $T_f$ is the temperature of the flame, $T_p$ is the pyrolysis temperature of the material, and $T_\infty$ is the ambient temperature. Homopolymer films without any additives show almost immediate dripping after ignition and generate a high number of drips.[3,12] Nearly all of them also show excessive burning rates.[4,13-17]

To reduce the dripping severity in polymers, anti-dripping agents are commonly used in the plastic industry. Polytetrafluoroethylene (PTFE) is a known anti-dripping agent that forms fibrils in the polymeric matrix, furnishing the material with increased extensional viscosity.[18-22] To counteract the notoriously flammable nature of polymers, flame retardants are added to plastic products to delay the flame advancement based on three main mechanisms: vapor phase inhibition,[13,16] solid phase char-formation,[14,15,17] and cooling.[23] Vapor phase inhibition takes place once the additives produce components that react with the burning material in the vapor phase to disrupt the production of free radicals.[13,16] Commonly, this type of additive consists of halogenated molecules.[16] For the mechanism involving solid phase char-formation, the additives react to form a carbonaceous char layer that insulates the polymer, which slows pyrolysis and forms an oxygen barrier layer.[14] Additives with phosphorous and nitrogen chemistries are examples of flame retardants in this category. Recently, Chu et al.[14] used layers of phosphorous and silicon coatings to improve the barrier properties of fabric-reinforced polyester composites and hamper the heat release during the combustion process. Additives such as phase change materials that undergo an endothermic reaction during burning promote a cooling mechanism to slow down the combustion reaction.[23]

A plethora of research shows that toxic fumes are released from anti-dripping and flame retardant additives including halogenated substances during combustion.[24] Shimizu et al.[24] showed that exposure to PTFE fumes renders fever, dyspnoea, and non-productive coughs, all proven to be originated by diffuse interstitial infiltration in the lungs. It is worth noting that environmental safety regulations, such as the Restriction oazardous Substances Directive (RoHS), promote halogen free substances, which limits the use of many historically used additives.[25] On the other hand, additives used as anti-dripping agents and flame retardants are costly and impose processing challenges such as nonhomogeneous dispersion due to poor mixing.[26,27] Hence, finding a solution that relies on morphological structures rather than material chemistry is highly desirable.

Investigation of the relationship between morphology and burning rates or dripping in polymers has been limited to filled polymers.[28-30] Kashiwagi et al.[28] reported lower burning rates for polymeric nanocomposites containing carbon nanotube additives with high aspect ratios. This is due to the formation of a network structure of nanoparticles in the polymeric matrix that hinders the pyrolysis reactions and decreases the release rate of flammable volatiles. In another study, Liu et al.[29] reported that better dispersion of clay decreases the peak mass loss rate of poly(styrene-co-acrylonitrile) nanocomposites. They showed that with a stronger network within the polymeric matrix, the bubbling of released volatiles is suppressed as a protective char layer is formed under degradation conditions. However, there does not appear to have been any research investigating the effect of morphological configurations on dripping and burning rates in unfilled polymers.

Accordingly, there is a need for new polymer composite materials, and more specifically to multilayer polymer composite materials with delayed and reduced dripping.

SUMMARY

In accordance with one broad aspect, multilayer composite materials are described herein. The multilayer composite materials include a first layer comprising a first polymer and a second layer comprising a second polymer. The first layer and the second layer abut each other. The first layer and the second layer each have a thickness in a range of about 10 nm to about 1 mm. The first layer and the second layer are arranged to provide for the composite material to have reduced dripping and a delayed first dripping time as the multilayer composite material undergoes a combustion process relative to a single layer having a same thickness as a thickness of the multilayer composite material.

In at least one embodiment, the multilayer composite material comprises between two sheets and about 2500 sheets.

In at least one embodiment, the multilayer composite material comprises about 512 layers, or about 640 layers, or about 1520 layers or about 2540 layers.

In at least one embodiment, the first polymer and the second polymer are a same polymer.

In at least one embodiment, the first polymer and the second polymer are different polymers.

In at least one embodiment, alternating layers of the multilayer composite material comprise the first polymer and the second polymer, respectively.

In at least one embodiment, the multilayer composite materials includes a third layer comprising a third polymer, the third polymer being different than the first polymer and the second polymer.

In at least one embodiment, the multilayer composite materials includes a fourth layer comprising a fourth polymer, the fourth polymer being different than the first polymer, the second polymer and the third polymer.

In at least one embodiment, each of the layers has a same thickness.

In at least one embodiment, each of the layers has a different thickness.

In at least one embodiment, the thickness of the multilayer composite material is in a range of about 0.1 mm to about 3 mm.

In at least one embodiment, the thickness of each layer of the multilayer composite material is in a range of about 10 nm to about 0.1 mm.

In at least one embodiment, the thickness of each layer of the composite material is in a range of about 40 nm to about 0.01 mm.

In at least one embodiment, the multilayer composite material has a drip time in a range of about 30 to about 40 s/mm or of about 36 s/mm.

In at least one embodiment, the multilayer composite material has a normalized number of drips in a range of about 100 drips/mm to about 250 drips/mm, or of about 190 drips/mm, or of about 120 drips/mm.

In at least one embodiment, the first layer and the second layer are arranged to provide for the composite material to have an increased extensional viscosity relative to a single layer having the same thickness as the thickness of the multilayer composite material.

In at least one embodiment, the first layer and the second layer are arranged to provide for an increased interfacial tension as a temperature of the composite material increases during the combustion process relative to a single layer having the same thickness as the thickness of the multilayer composite material.

In at least one embodiment, the first polymer is a polyethylene-based polymer.

In at least one embodiment, the first polymer is a linear low-density polyethylene-based polymer.

In at least one embodiment, the second polymer is a polypropylene-based polymer.

In accordance with another broad aspect, methods of forming multilayer composite materials are described herein. The methods include splitting a first polymer stream into a plurality of first polymer streams in a feedblock, splitting a second polymer stream into a plurality of second polymer streams in a feedblock, combining the plurality of first polymer streams with the plurality of second polymer streams in an alternating fashion to form a plurality of discrete, alternating layers; and using a multiplication die, increasing a number of the alternating layers to form a multilayer composite material, each layer of the multilayer composite material having a thickness in a range of about 10 nm to about 0.5 mm.

These and other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figures 1A, 1B:
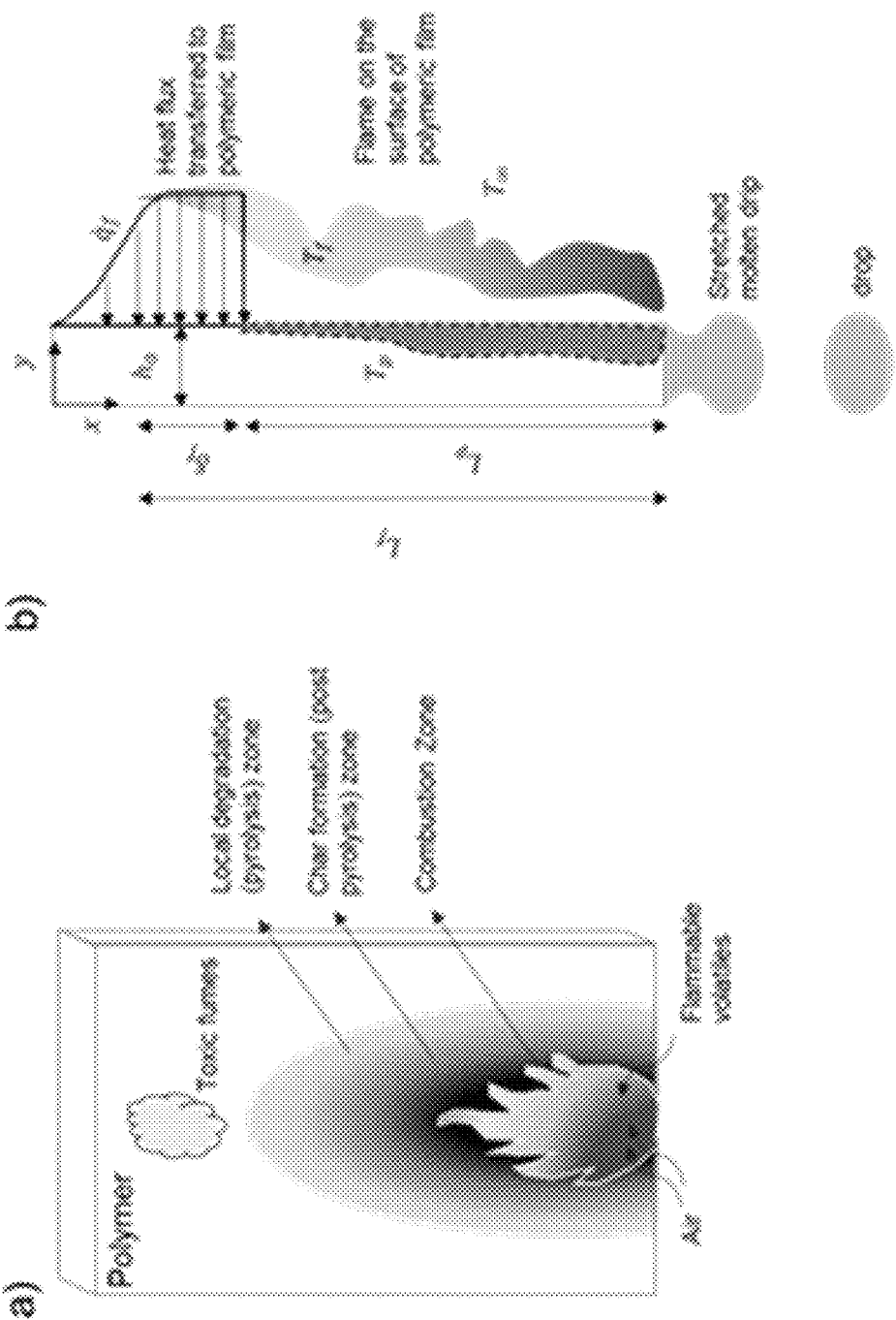
FIG. 1A is a schematic diagram showing different zones in a combustion process, including but not limited to the local degradation zone, the char (or post pyrolysis zone) and the combustion zone.
FIG. 1B is a schematic diagram showing a surface flame advancement process.

Further aspects and features of the example embodiments described herein will appear from the following description taken together with the accompanying drawings.

DESCRIPTION OF EXAMPLE EMBODIMENTS

Various apparatuses, methods and compositions are described below to provide an example of at least one embodiment of the claimed subject matter. No embodiment described below limits any claimed subject matter and any claimed subject matter may cover apparatuses and methods that differ from those described below. The claimed subject matter are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed subject matter. Any subject matter that is disclosed in an apparatus, method or composition described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term, such as 1%, 2%, 5%, or 10%, for example, if this deviation does not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive-or. That is, "X and/or Y" is intended to mean X, Y or X and Y, for example. As a further example, "X, Y, and/or Z" is intended to mean X or Y or Z or any combination thereof. Also, the expression of A, B and C means various combinations including A; B; C; A and B; A and C; B and C; or A, B and C.

The following description is not intended to limit or define any claimed or as yet unclaimed subject matter. Subject matter that may be claimed may reside in any combination or sub-combination of the elements or process steps disclosed in any part of this document including its claims and figures. Accordingly, it will be appreciated by a person skilled in the art that an apparatus, system or method disclosed in accordance with the teachings herein may embody any one or more of the features contained herein and that the features may be used in any particular combination or sub-combination that is physically feasible and realizable for its intended purpose.

Recently, there has been a growing interest in developing new technologies that increase the fire safety of polymers. These technologies may include the avoidance of additives, such as but not limited to environmentally dangerous additives, that may become toxic upon combusting.

Combustion is a phenomenon that combines ignition, heat-transfer, fluid flow and chemical reaction kinetics. Studies have shown that flame spread in polymers is usually a two-dimensional phenomenon that begins with a brief period of laminar flow followed by progression to turbulent behavior. The combustion reaction takes place by heating, pyrolysis, ignition, flame spread, and fire development. FIG. 1A shows different zones in a combustion process, including but not limited to the local degradation zone, the char (or post pyrolysis zone) and the combustion zone.

Once the polymeric material is ignited, there is a cycle of processes that occur and cause the flame to spread. These processes include the heat transfer between the flame and solid material, degradation and gasification of the solid material, release of volatile gases, and combustion of the volatile gases.

Dripping in the combustion process of polymeric materials is due to the capillary breakup of the stream of melted polymer that forms behind the flame front.

Herein, multilayer composite materials, such as multilayer polymer films, are described. The multilayer composite materials generally show improvement, for example reduced, response in a combustion process. For instance, the multilayer composite materials described herein generally offer reduced dripping and/or reduced flame spread rates relative to non-layered composite materials.

The multilayer composite materials provided herein are composite materials that include multiple different layers. For example, the composite materials described herein may include at least two layers. In at least one embodiment, the composite materials described herein include at least three layers. In at least one embodiment, the composite materials described herein include more than three layers. For instance, in at least one embodiment, the composite materials described herein include or more than 10 layers, or more than about 100 layers, or more than about 500 layers, or more than about 1500 layers, or more than about 2500 layers.

In at least one embodiment, the multilayer composite materials described herein include about 512 layers, or about 640 layers. In at least one embodiment, the composite materials described herein include about 1520 layers, or about 2560 layers.

In at least one embodiment, the composite materials described herein comprise multiple layers of a same material. In at least one embodiment, the composite materials described herein comprise one or more layers of different materials. In at least one embodiment, the composite materials described herein comprise one or more layers of two different materials, or more than two different materials. In at least one embodiment, the composite materials described herein comprise a plurality of layers of two different materials, each material forming alternating layers with the other material.

Figure 2:
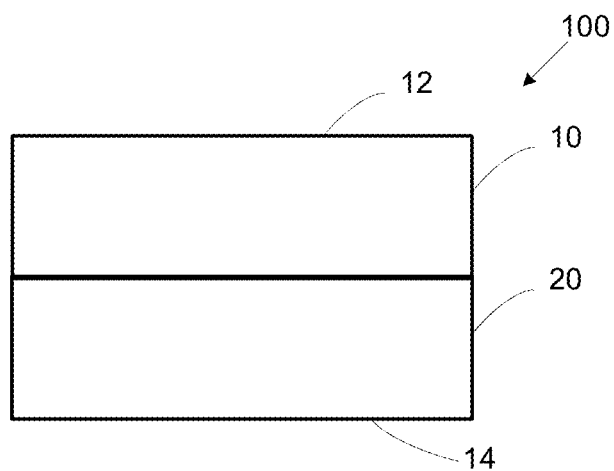
FIG. 2 is a schematic diagram showing a multilayer composite material according to at least one embodiment described herein.

For example, as shown in FIG. 2, a multilayer composite material 100 may comprise a first layer 10 and a second layer 20. The first layer 10 of multilayer composite 100 may comprise a nonwoven material, as described herein, which may char when burned and/or exposed to heat and/or flame. The first layer 10 may include a surface 12 that is an outer layer of the composite 100. The second layer 20 may also comprise a nonwoven material, as described herein, which may char when burned and/or exposed to heat and/or flame. The second layer 20 is generally not adhered to the first layer 10 by any compound and/or adhesive. The second layer 20 may include a surface 14 that is also an outer layer of the composite 100.

In at least one embodiment, the first nonwoven layer and the second non-woven layer may each be continuous layers.

Herein, the non-woven layers may include synthetic materials, such as but not limited to polymer materials, thereby forming polymer layers. The polymer layers of the multilayer composite materials described herein may include, but are not limited to including, one or more polyolefins such as but not limited to polyethylene (PE) and/or polypropylene (PP). For example, the polymer layers may include but are not limited to, one or more of ethylene vinyl alcohol (EVOH), nylon (e.g., nylon 6 and/or nylon 6,6), polyolefins (e.g. polypropylene (PP)), polyethylene (PE) (e.g. polyethylene high density and/or polyethylene low density), polyvinylidene chloride (PVDC) (e.g. Saranex®), polyvinylfluoride (PVF) (e.g. Tedlar®), acrylic, acrylonitrile rubber, butyl rubber, chlorosulfonated polyethylene (e.g. Hypalon®), ethylene chlorotrifluoroethylene copolymer (ECTFE) (e.g. Halar®), ethylene propylene diene monomer (M-class) rubber-coatings (EPDM rubber), fluorinated ethylene propylene (FEP), fluoro-elastomer polymers (e.g. Viton®), liquid crystal polymers, metal foils, natural rubber, neoprene, perfluoroalkoxy copolymer (e.g. Teflon® PFA), polimide, polyimide-imide (e.g. Tecator® and Torlon®), polyamides, polyesters (e.g. Mylar®), polyether sulfone, polyetheretherketone (PEEK); (e.g. Victrex®), polyetherimide, polymeric coatings, polyphenylsulfone (PPS), polysulfone, polytetrafluoroethylene (PTFE) (e.g. Teflon®), polyurethane, polyvinyl chloride (PVC), polyvinylidene fluoride (PVDF) (e.g. Kynar®) polyvinyl chloride-acetate (PCA), styrene butadiene rubber (SBR), polylactic acid (PLA), Polyhydroxyalkanoates (PHA's), polyglycolic acid (PGA), nylons (e.g. nylon 6,6, nylon 6, and nylon-MXDs), polyesters (e.g. polycaprolactone (PCL), polyethylene terephthalate (PET, PETE)), natural polymers (e.g. lignocellulosic polymers) vacuum metallized films, extrudable polymers that are used for chemical barrier films in the market place, and/or any variation, combination and/or hybridization thereof.

In at least one embodiment, the layers of the multilayer composite materials described herein include one or more of PEEK, polyethylene, polyolefin, ECTFE, PVF, nylon, EVA, EVOH, polypropylene, polyester, and/or ethylene-vinyl chloride (EVCL).

In at least one embodiment, the multilayer composite materials are polymer films having a first layer comprising a first polymer material and a second layer comprising a second polymer material. The multilayer composite material may include a plurality of first layers and a plurality of second layers. The plurality of first layers may be arranged in any manner and the plurality of second layers may be arranged in any manner. For instance, the plurality of first layers may be stacked upon each other and the plurality of second layers may be stacked upon each other. In another example, the plurality of first layers may be dispersed within the plurality of second layers (e.g. alternating with).

In at least one embodiment, the multilayer composite materials are polymer films having first, second and third layers, each layer comprising s different polymer material. Again, the plurality of first, second and third layers may be arranged in any manner.

In at least one embodiment, the multilayer composite materials are polymer films having first, second, third and fourth layers, each layer comprising s different polymer material. Again, the plurality of first, second, third and fourth layers may be arranged in any manner.

In at least one embodiment, the multilayer composite materials are polymer films having alternating layers of polyethylene (mIE) and isotactic polypropylene (MR10).

In at least one embodiment, the multilayer composite materials are polymer films having alternating layers of polyethylene (mIE) and isotactic polypropylene (MR10) and are formed by co-extrusion using multiplier slit dies.

In at least one embodiment, the multilayer composite materials are polymer films having alternating layers of polyethylene (mIE) and isotactic polypropylene (MR10) and are formed by co-extrusion using multiplier slit dies.

Generally, the composite materials described herein are free of any flame retardants additives. For instance, a flame retardant additive is a non-polymeric additive or blend of additives used to impart or increase flame resistance properties of an article or material.

In at least one embodiment, the morphology (i.e. the arrangement and/or relative size of the layers) of the composite materials described herein provide at least two physical phenomenon close to the combustion zone when the composite materials are heated. First, in at least one embodiment, the morphology of the composite layers provides for individual layers to thicken in the combustion zone which is an indicator of retraction of the individual layers. Retraction of the individual layers can delay the onset of drips and reduce the number of drips of the composite materials.

Secondly, reduction in normalized drip numbers of the composite materials described herein can also be attributed to the morphology of the composite materials described herein providing for each layer to undergo an increase in extensional viscosity. In at least one embodiment, the number of layers of the composite material may provide for an increase of the extensional viscosity of the composite material, for example in an area close to the combustion zone.

In at least one embodiment, methods of forming composite materials, including but not limited to multilayer composite materials are described herein.

In at least one embodiment, the multilayer composite materials described herein are formed in a coextrusion process using multiplier slit dies. The details of the process have been described elsewhere.[33]

For example, in at least one embodiment, PE/PP multilayers can be formed by, using a first (e.g. a single screw or a twin screw) extruder, feeding PE to one or more dies while also, using a second (e.g. a single screw or a twin-screw extruder) extruder, feeding PP to the same dies. Each extruder may be connected to a gear pump to control the volumetric flow rate and overall film composition.

After being extruded from one of the extruders, the molten polymer streams are delivered to a feedblock to split each stream into a plurality of streams. For example, each stream may be split into 10 streams. These streams are then combined in an alternating fashion to form a plurality of discrete, alternating layers. For example, in the event that the feedback splits each stream in to 10 streams, the two groups of 10 streams may be combined in an alternating fashion to form 20 discrete layers.

One or more (e.g. a series) of multiplication dies may be used to split each incoming stream into two identical streams that can be stacked on top of one another, so that each multiplying die doubled the number of layers. In one example, five multipliers may be used to manufacture composite materials comprising about 640-layer films. In another example, seven multipliers may be used to manufacture composite materials comprising about 2560-layer films. The skilled person will understand that other amounts of layers may be formed by splitting the molten polymer streams into a different number of split streams and/or subsequently using different multiplication dies.

Examples

In one example, linear low-density PE and two grades of PP were used to investigate the effects of multilayer versus blend morphology on dripping and burning rates in polymeric films. Also, polytetrafluoroethylene (PTFE) additives, polystyrene (PS), and commercial DuPont Tyvek® home wrap were obtained for establishing a reliable benchmark for the investigation.

Materials

Table 1 lists the polymers used in this example along with information about their density and melt flow indices. Polymers were used as received from suppliers. Pairs of PE and PP were used to prepare blends and the multilayered structures with nominally 640 and 2560 layers at a 50/50 volume composition. Also, 50/50 melt blends of the PE/PP pair with up to 2% wt. of PTFE were prepared.

PTFE (Polyflon MPA FA-5601) powders were acquired from Daikin Industries, Ltd. and used as anti-dripping agents. The bulk density of the powders was 0.45 g/mL and their average particle size was 0.5 mm. Also, PS and DuPont™ Tyvek® HomeWrap®, a commercially available product, were obtained and used as received.

Multilayer Film Fabrication

Multilayer film samples were prepared in a coextrusion process using multiplier slit dies. The details of the process have been described elsewhere.[33] In the PE/PP multilayers, a single screw extruder (25 mm diameter, Killion) fed PE to the dies while a twin-screw extruder (16 mm diameter, Prism TSE 16TC) delivered PP to the dies. Each extruder was connected to a gear pump to control the volumetric flow rate and overall film composition. Then, the molten polymer streams were delivered to a feedblock that split each stream into 10 streams. These streams were combined in an alternating fashion to form 20 discrete layers. A series of five multiplication dies were used to split each incoming stream into two identical streams that were stacked on top of one another so that each multiplying die doubled the number of layers. Five multipliers were used to manufacture nominally 640-layer films; seven multipliers were used to manufacture the nominally 2560-layer films. A fishtail die was used to fabricate each film with a final cross-section of 22×0.8 mm. The temperatures of all parts were set and controlled at 200° C. The fabricated films were quenched on counter-rotating chill rolls with temperatures at 90° C. before winding up on a spool. The overall thickness for the prepared films after cooling was controlled to be between 0.1 and 0.7 mm by adjusting the speed of the chill rolls. The range of thicknesses provided for investigation of the impact of thickness on dripping and burning rates of the produced films. Layered PE/PP samples were annealed to investigate the influence of annealing on dripping and burning rates in the films. Annealing took place for 2 min at 180° C. The samples were quenched after annealing using cold plates at 90° C. The films were characterized by SEM and TEM as described below.

TABLE 1

Polymers used for this study.

| Polymer | Manufacturer | Grade name | Density (25° C.), ρ [g/cm³] | Melt Flow Index (190° C./2.16 kg) [g/10 min] | Melt Flow Index (230° C./2.16 kg) [g/10 min] |
|---|---|---|---|---|---|
| PE | Total | Lumicene ® M1835 | 0.918 | 3.5 | — |
| PP | Total | Lumicene ® MR10MM0 | 0.902 | — | 10 |
| PTFE | Daikin Chemicals | Polyflon MPA FA-5601 | 0.45 | — | — |
| PP' | RTP Company | RTP100 | 0.91 | — | 4 |
| PS | Americas Styrenics LLC | STYRON 666D | 1.04 | 8 (@ 200° C./5 kg) | — |

Blend Film Fabrication

Blends of PE/PP were prepared using a Haake batch mixer at a set temperature of 180° C. and a rotor speed of 150 rpm. The mixed samples were removed from the internal mixer after 600 s. Blend films were produced by hot press compression (Carver Press). The samples were heated up to 180° C. for 60 s and then pressed under 8900 N for the duration of 60 s. Spacers were used to make films with thicknesses ranging from 0.1 to 0.7 mm. Also, several PS films were produced by hot pressing under the same conditions.

The notation used herein, e.g., PE/PP/640A, refers to the materials in the films followed by the nominal number of layers, based on ideal multilayer coextrusion. Letter "A" refers to the multilayer samples that were annealed. Letter "B" refers to the blends. For the samples containing PTFE, the number following "PTFE" is the weight percentage of the additive.

Fire Test Measurements

Figures 3A, 3B:
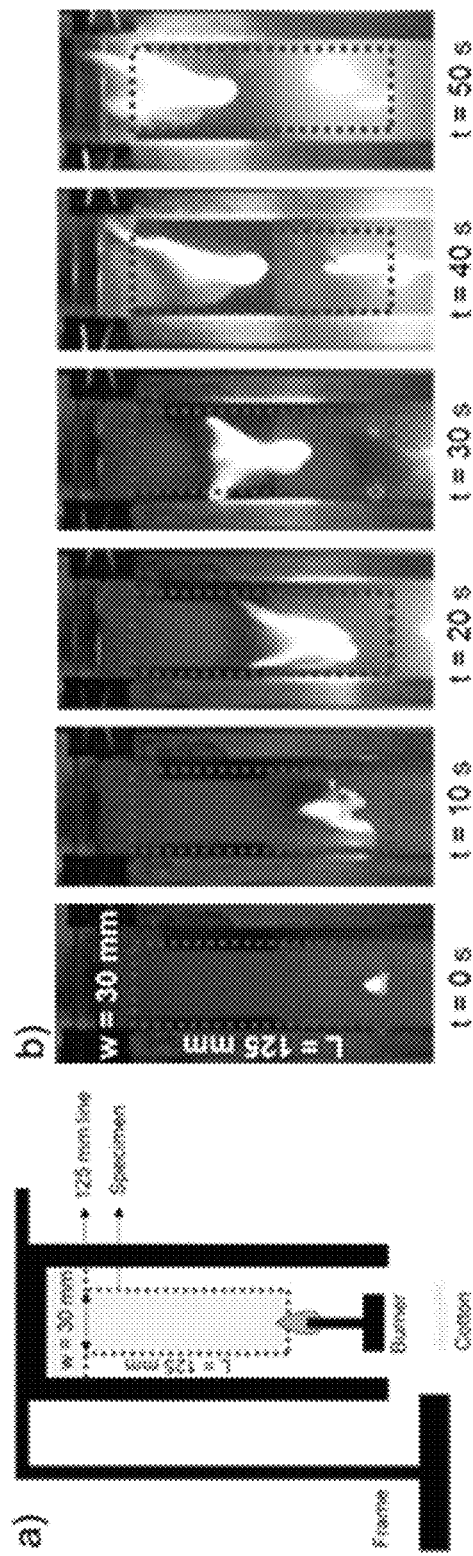
FIG. 3A is a schematic diagram showing a UL94 fire test set-up.
FIG. 3B shows images of a representative UL94 fire test for PE/PP/2560 taken at 10 s time intervals.

Dripping and burning rates were measured following the procedure specified by the UL94 vertical flame test, which is illustrated in FIG. 3A. The UL-94 flame test is the most general standard for plastic products. A Bunsen burner with a 20 mm flame height was placed underneath the specimens. The samples, 125×30 mm, were clamped between aluminum frames using two clips and experiments were performed inside an aluminum frame under a fume hood. Use of the frame limited perturbation of the airflow around the sample. Sample burning was recorded using a Canon Rebel T3i high definition camera up to the point where the flame passed the 125 mm mark line. Film footage was manually analyzed to determine the burning rate, first drip time, and the total number of drips. Experiments were repeated three times for each sample. On each of the following figures, the range of data points has been shown with a box while the line in the middle of the box is the median of the data set, and the "x" within the box is the mean of the data set of three measurements. Images of a representative burning sample obtained at 10 s time intervals are shown in FIG. 3B.

Layered Structure

Figure 4A:
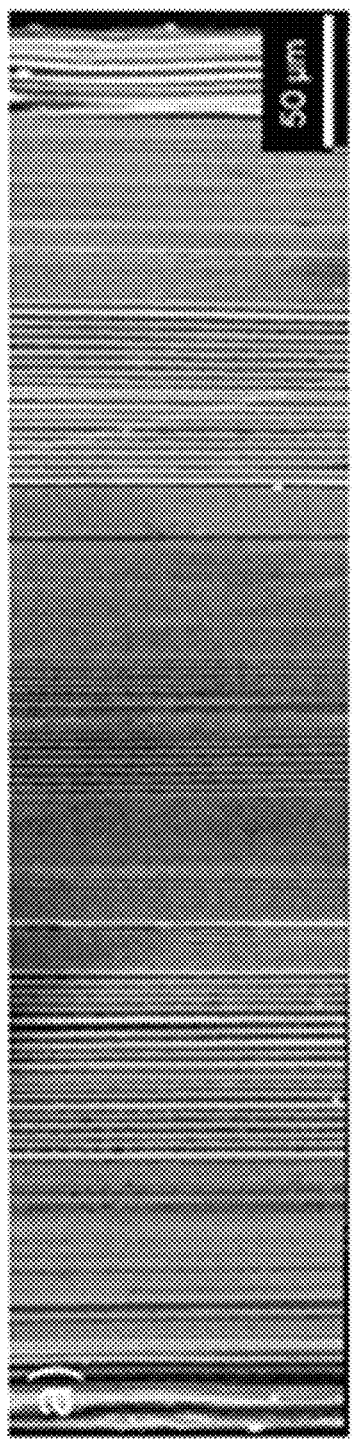
FIG. 4A shows scanning electron microscope (SEM; electron back-scattered for the stained samples; several images combined) image of 640-layer PE/PP film.
Figure 4C:
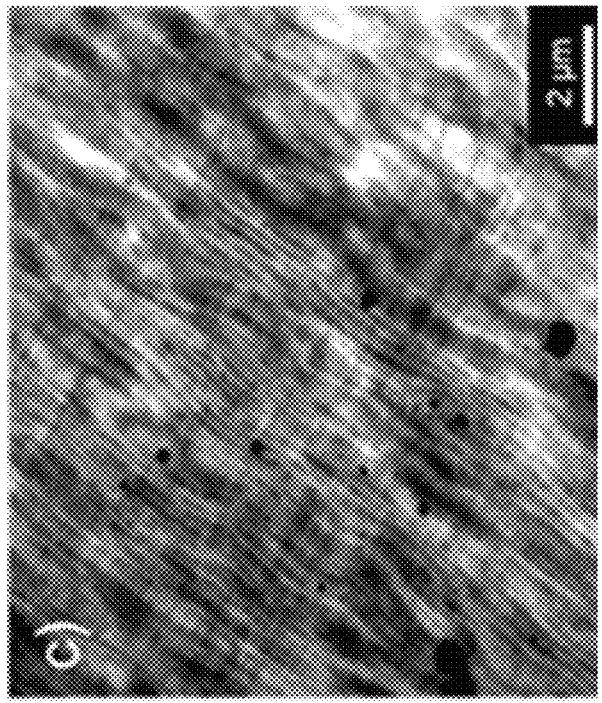
FIG. 4C shows a TEM image of a second region of a nominal 2560-layer PE/PP film.
Figure 4B:
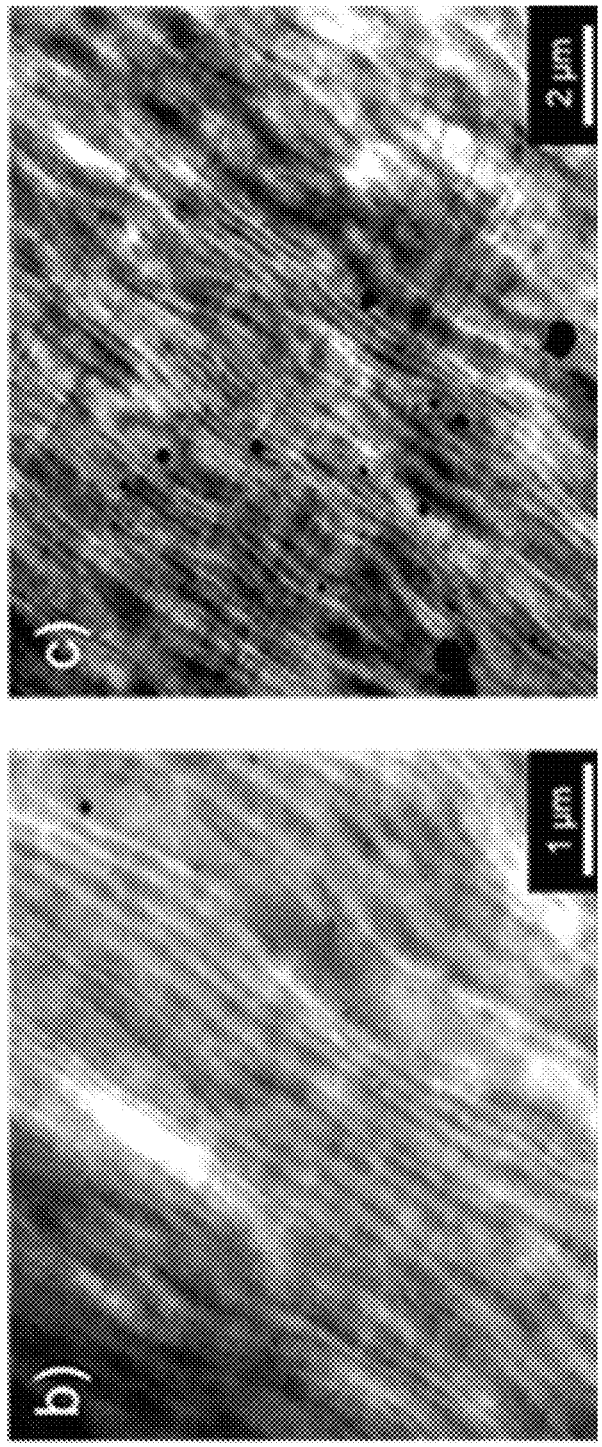
FIG. 4B shows a TEM image of a first region of a nominal 2560-layer PE/PP film.

Film morphology was investigated to quantify the number of layers present in each multilayer film. FIG. 4 shows representative SEM and TEM images obtained from the nominally 640-layer and 2560-layer PE/PP films. The images show that continuous, discrete layered structures are present in the films although the number of layers is less than the nominal number of layers. The actual number of layers for PE/PP/640 and PE/PP/2560 is estimated to be around 512 and 1520, respectively. The lower number of layers is due to layer breakup that happens in the multiplying die blocks. In labeling the samples, the nominal numbers were retained.

Effect of Material Thickness on Dripping and Burning Rates

Figure 5A:
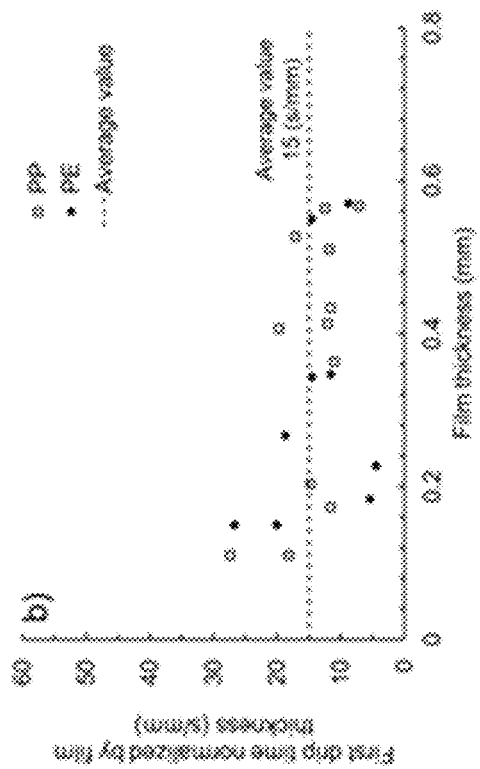
FIG. 5A is a graph showing a number of drips normalized by film thickness for PE and PP films as a function of film thickness.

Polymeric films were fabricated in varying thicknesses. To investigate the effect of thickness on dripping and burning rates, samples of homopolymers with different thicknesses were prepared. FIG. 5A presents the number of drips normalized by film thickness for PE and PP samples. The average value of all data points, corresponding to 1730 drips/mm with the standard deviation of 510 drips/mm, has been marked as a dashed line in FIG. 5A. It can be seen that the normalized values are clustered around the average value line, showing almost no dependency on film thickness within experimental error. As the thickness of the film changes, the volume of the samples changes accordingly since the other two dimensions are fixed according to the UL94 fire test standard. The consistent clustering of the normalized values around the average, independent of film thickness, can be attributed to the proportionality between the mass of the sample and the number of drips. It can be inferred that regardless of the sample volume, the size of the drips is almost constant. Also, PE and PP show comparable numbers of normalized drips.

Figure 5B:
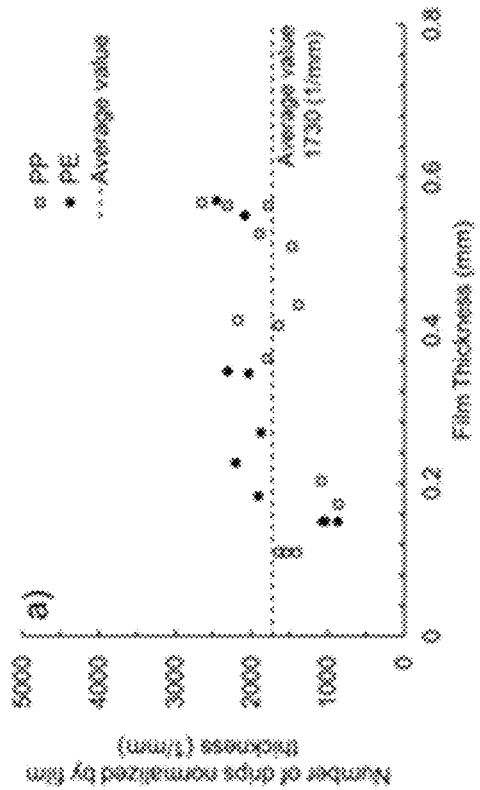
FIG. 5B is a graph showing normalized first drip time as a function of film thickness for PE and PP samples.

FIG. 5B shows the first drip times normalized by film thickness as a function of film thickness. Analogous to drip numbers, first drip times have a relationship with thickness. The dashed line in FIG. 5B shows the average value for the normalized first drip times of PE and PP films, corresponding to 15 s/mm with a standard deviation of 6 s/mm. Although the standard deviation is large, there is no trend, and the experimental values are clustered around the average value line and the normalized first drip times are independent of film thickness within experimental errors. The gravity forces can be equated with the resistance of a viscous droplet at the pinch-off time for slow extensional rates. Pinch-off time (here first drip time), t*, can be estimated as shown below in Eq. (1):

$$t^* \sim \frac{\eta_E}{\rho g r_{cr}^2} h_0 \tag{1}$$

where $\eta_E$ is the extensional viscosity, $\rho$ is the density, g is the acceleration of gravity, $h_0$ is the sample thickness, and $r_{cr}$ is the critical radius at which the droplet disengages from the melt stream. Extensional viscosity acts as a resistance against droplet falling and delays the first drip time. As the extensional viscosities for PE and PP samples are similar,[34] the first drip times for these samples agree within the experimental error. According to Eq. (1), the thicker the sample is, the longer it takes for droplet disengagement from the stream of fluid. Hence, normalizing the number of drips and first drip time to sample thickness permits quantitative comparisons between samples with different thicknesses.

Sample thickness plays additional roles in the burning rates of polymers. The effect of thickness on the linear burning rates for PP and PE samples is illustrated in 6A, where the linear burning rates were calculated by determining the time required for the flame to reach the 125 mm mark line (see FIG. 3). In studies that deal with burning rate, materials are usually grouped into two categories: (i) thermally thin materials with Biot numbers less than 1, and (ii) thermally thick films with Biot numbers greater than 1 mm.[3,35] In thermally thin materials, thermal inertia is negligible and the temperature gradient across the sample can be neglected.

Most of the predictions for burning rates have been based on the simple models developed by de Ris.[36] For thermally thick films with semi-infinite fuel beds, de Ris obtained the linear burning rate, V, as,[36]

$$V \cong \frac{\dot{q}_f^2 \delta_f}{k \rho C_p (T_p - T_\infty)^2} \tag{2}$$

while for thermally thin films, $$V \cong \frac{\sqrt{2} \, k(T_f - T_p)}{\rho C_p h_0 (T_p - T_\infty)} \tag{3}$$

where k is the thermal conductivity of the material, ρ is the material density, $C_p$ is the heat capacity, and $h_o$ is the film thickness. The other parameters are defined in FIG. 1B. The Biot number is the ratio of the thermal resistance inside the material to the thermal resistance at the surface. For a film of 0.7 mm thick Bi=0.016 to 0.16, much smaller than 1. Since the polymeric specimens in this study are thinner than 0.7 mm, they are safely considered thermally thin and Eq. (3) was used to evaluate experimental results on burning rates.

Figure 6B:
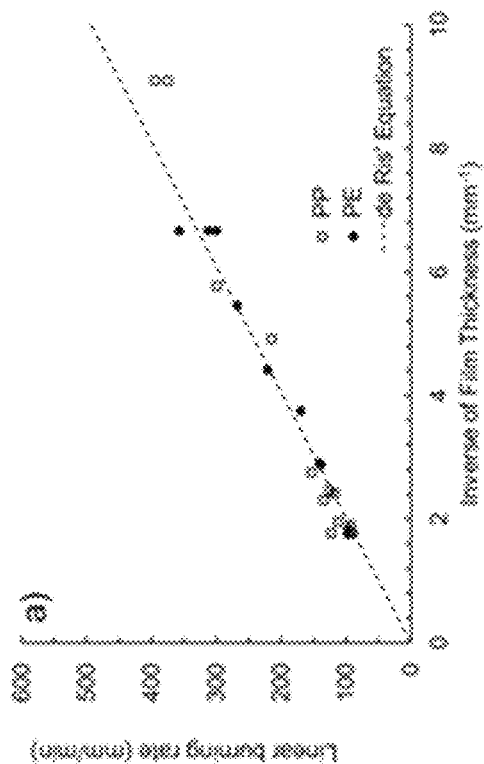
FIG. 6B is a graph showing volumetric burning rate as a function of the inverse of thickness.
Figure 6A:
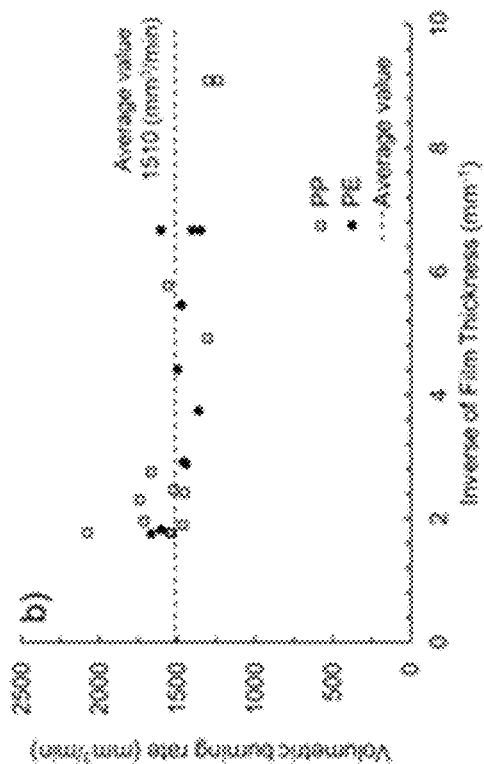
FIG. 6A is a graph showing linear burning rate as a function of the inverse of thickness. The dashed line shows the theoretical values calculated using the parameters listed in Table 2, below.

The measured burning rates are in excellent agreement with the predictions proposed by de Ris in Eq. (3), as shown in FIG. 6A. These predictions were generated using the values listed in Table 2, which are typical for polyolefins. FIG. 5B shows the volumetric burning rates of the PE and PP films as a function of the inverse of thickness, where the values are clustered around an average value of 1510 mm³/s with a standard deviation of 180 mm³/s. This is in great agreement with the estimates of the de Ris model that predicts the average volumetric burning rates at 1481 mm³/s.

TABLE 2

Physical and thermal parameters and combustion temperatures for typical polyolefins.[37]

| Parameter | Symbol | Unit | Polyolefins |
| --- | --- | --- | --- |
| Heat capacity | $C_p$ | J/kg · K | 2000 |
| Melt Density | ρ | kg/m³ | 800 |
| Thermal conductivity | k | W/m · K | 0.22 |
| Flame temperature | $T_f$ | K | 2265 |
| Pyrolysis temperature | $T_p$ | K | 670 |
| Ambient temperature | $T_\infty$ | K | 293 |

Effect of PTFE Additive on Dripping

Figure 7A:
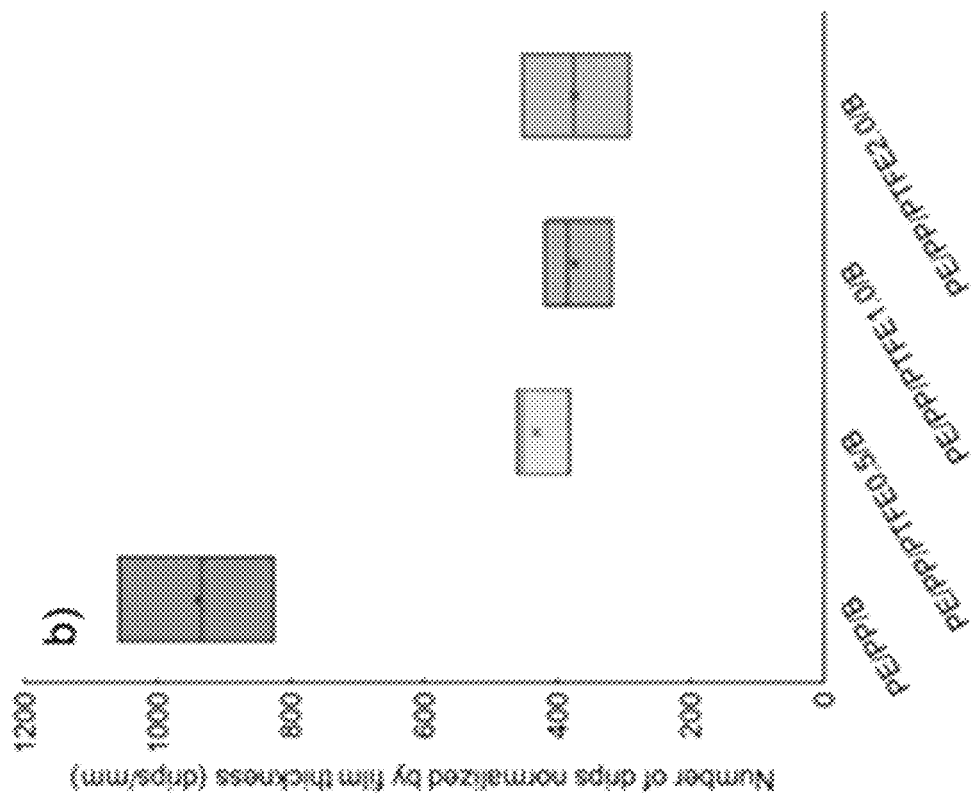
FIG. 7A is a graph showing first drip time normalized by film thickness.

PTFE is commonly used as anti-dripping and flame-retardant agents for polymeric materials. Although there are acute human health and environmental concerns around halogenated additives including PTFE,[24,25,38] the study was extended to PE/PP samples containing PTFE to establish a benchmark for the performance of the fabricated layered structures. FIG. 7A exhibits the normalized first drip time for the samples with and without PTFE additives. The addition of PTFE to the PE/PP blends increased the first drip times almost two-fold, from 11 s/mm for the PE/PP blends to 20 s/mm for the PE/PP blends containing 2% wt. of PTFE additive. The first drip times for the PE/PP blends containing 0.5% wt. and 1% wt. of PTFE additive were also about 22 s/mm. Thus, the improvement observed for the first drip time did not depend on the content of PTFE within the range of 0.5% wt. to 2% wt.

Figure 7B:
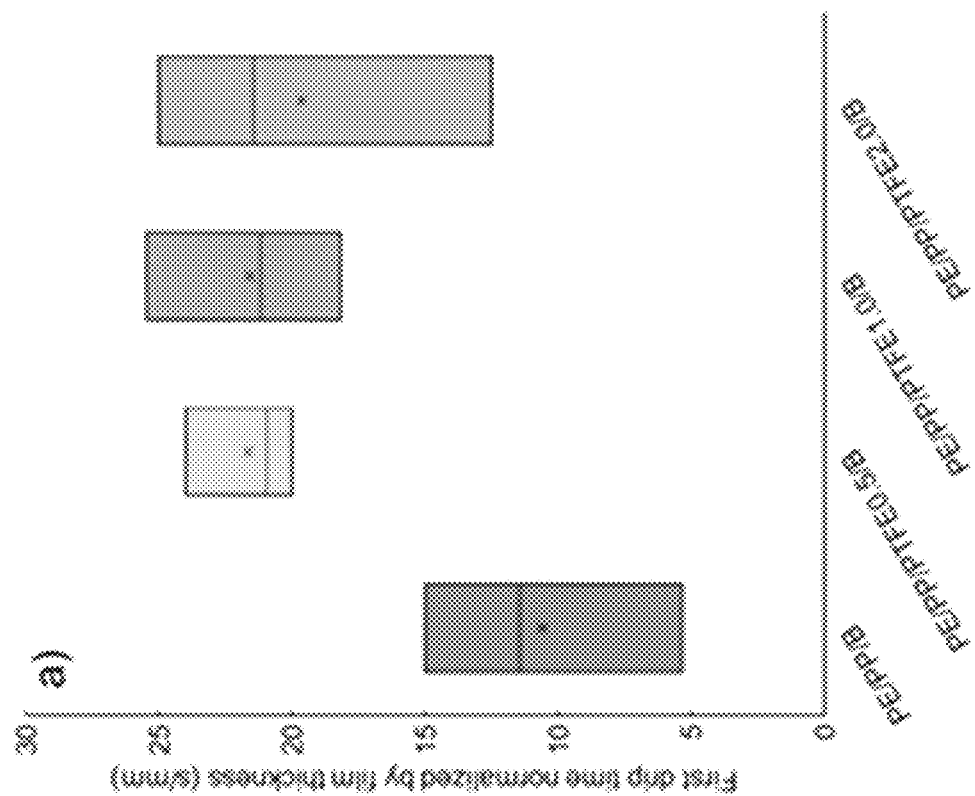
FIG. 7B is a graph showing a number of drips normalized by film thickness for blends of PE and PP with different contents of PTFE.

The normalized number of drips for the samples with and without PTFE additives are illustrated in FIG. 7B. The addition of PTFE to the PE/PP blends reduced the normalized number of drips from 940 drips/mm for the PE/PP blends to 370 drips/mm for blends with up to 2% wt. of PTFE. PTFE concentration had only a minor effect on the normalized number of drips which for 0.5% wt. and 1% wt. of PTFE additive were 413 drips/mm and 374 drips/mm, respectively. The reduction in drips has been attributed to the formation of PTFE fibrils in the blends that increase the extensional viscosity causing a delay in the first drip time and a concomitant reduction in the number of drips.[39] This observation is in line with the findings of Kempel et al.[40] who reported the efficacy of PTFE in preventing dripping by increasing the viscosity for polycarbonate/acrylonitrile butadiene styrene blends. Although PTFE can be a solution to reduce dripping in polymeric materials, these results show that, despite containing a halogen, PTFE additives do not provide a significant benefit to burning rates. In fact, 0.5% PTFE showed a 20% increase in burning rate (see FIG. 11).

Effect of Layered Structure on Dripping

Figure 8B:
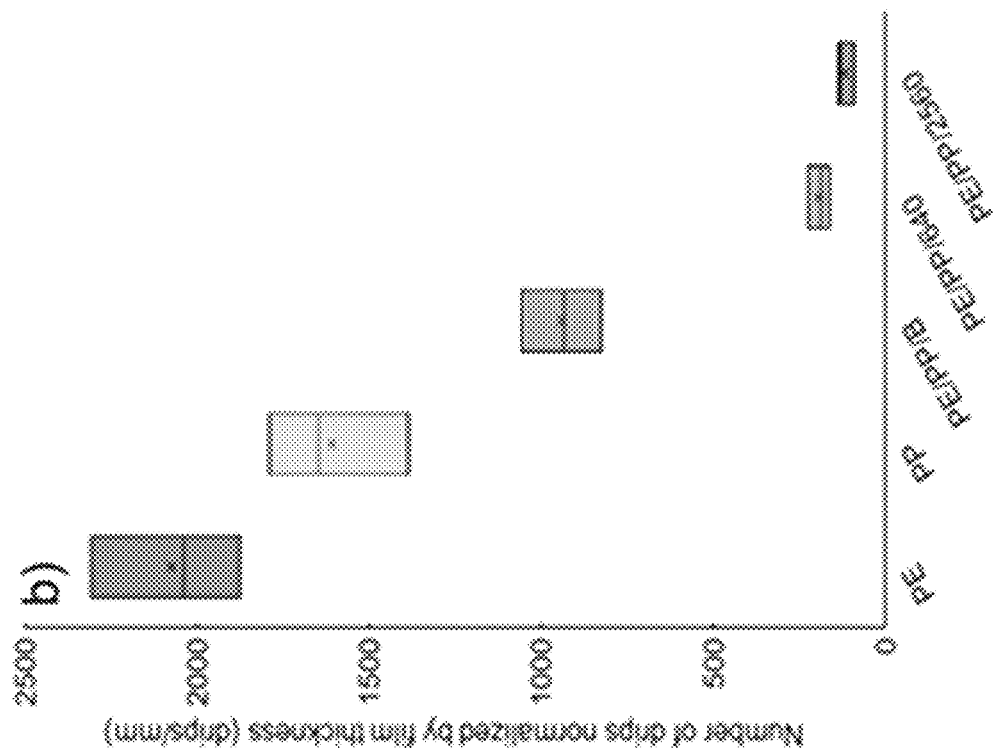
FIG. 8B is a graph showing a number of drips normalized by film thickness for samples of PE and PP with different structures (blend and layered).
Figure 8A:
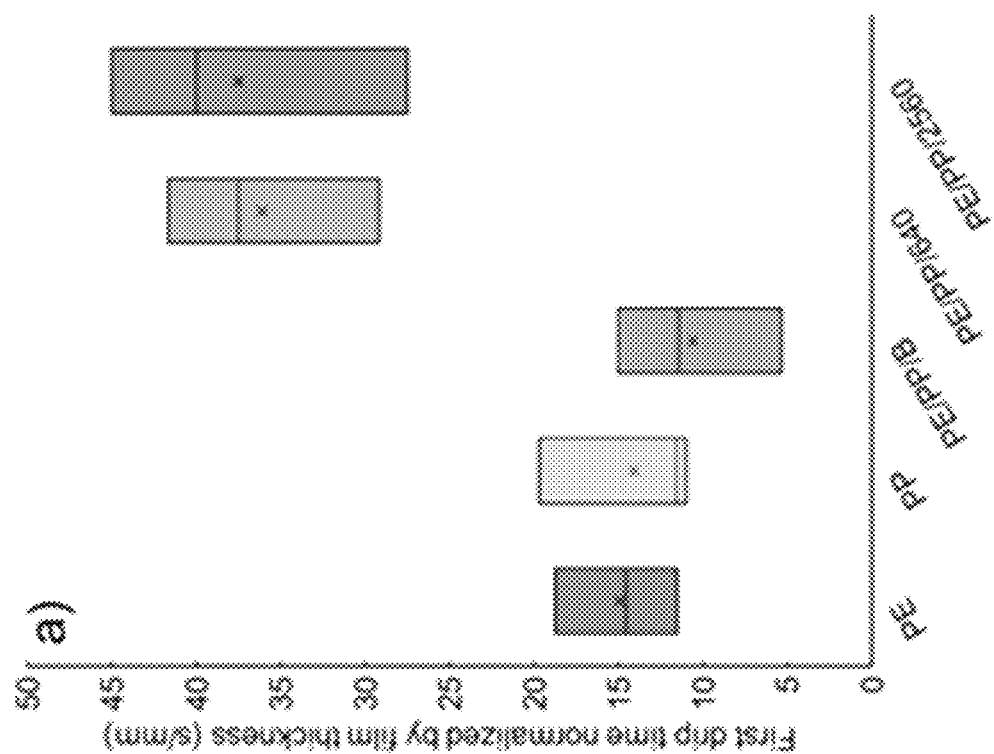
FIG. 8A is a graph showing first drip time normalized by film thickness.

After investigating the effect of thickness and understanding the influence of anti-dripping agents on dripping, samples with 640 and 2560 layers were investigated as extruded and after annealing to understand the effect of the layered structure on dripping. FIG. 8A depicts the normalized first drip times obtained for the PE and PP homopolymers, a 50/50 blend, and the layered PE/PP samples. Melt blended PE/PP films had a normalized first drip time of 11 s/mm, which was within the experimental error of the average normalized first drip times of the corresponding homopolymers, 14 s/mm. The normalized first drip time for coextruded multilayer films was significantly delayed in comparison, with PE/PP/640 at 36 s/mm; a 141% increase compared to melt blended PE/PP. This value for PE/PP/2560 was 37 s/mm, a 154% increase relative to the normalized first drip times of the melt blended PE/PP. Considering the experimental error, this increase from 640 layers to 2560 layers is not statistically significant. From the comparison of the values for PE/PP/640 and PE/PP/2560 with the PTFE filled samples (shown in FIG. 7), it can be inferred that the layered structure has a greater impact on delaying the first drip time although PTFE additives are extensively used as anti-dripping agents in the industry.

Besides the first drip time, the overall number of drips was also influenced by the different morphologies. As shown in FIG. 8B, the number of drips for the blends was 940 drips/mm, a reduction of 49% compared to the average value for the homopolymers of 1840 drips/mm. This result contrasts with the first drip time where there was little difference between blends and the homopolymers. For the multilayer samples, the normalized number of drips improved over 80% compared to PE/PP blends, reducing to 190 drips/mm and 120 drips/mm for PE/PP/640 and PE/PP/2560, respectively. The normalized number of drips for the PE/PP/640 and PE/PP/2560 samples were noticeably less than what was obtained for the PTFE filled blends (370 drips/mm). This finding shows the efficacy of the layered structure in reducing the drip numbers of PE and PP samples and suggests that layered structures could be an additive-free alternative to conventional anti-dripping agents. However, these results show that layered structures do not provide any benefit for burning rate relative to the PE/PP blends (see FIG. 12).

Figure 9A:
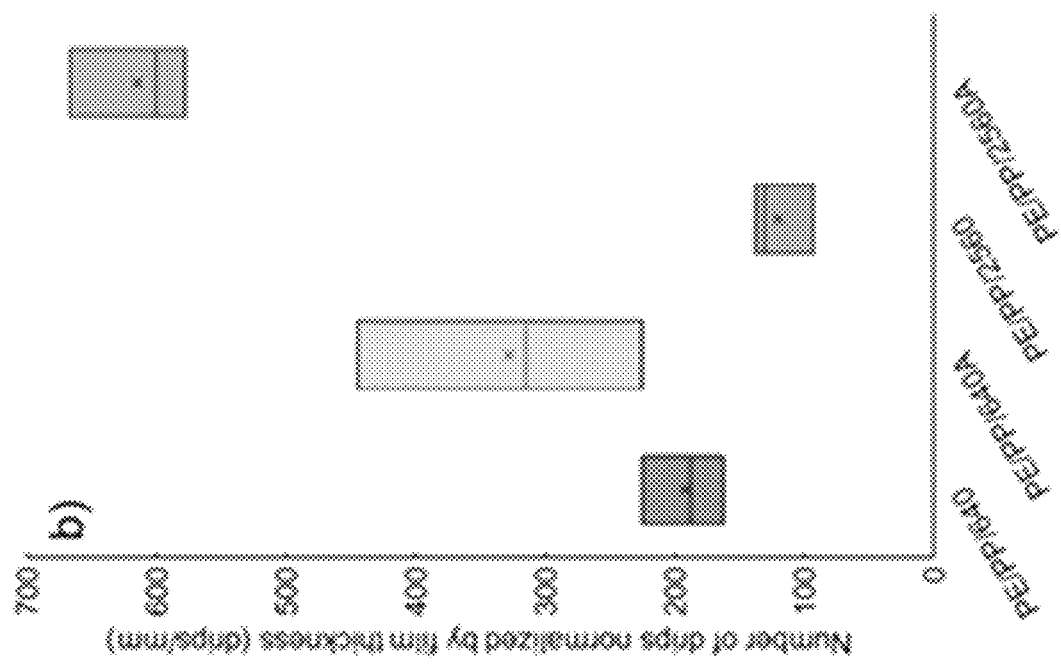
FIG. 9A is a graph showing first drip time normalized by film thickness.

To better understand how multilayer coextrusion contributes to dripping behavior and burning rates in PE/PP films, the multilayer samples were annealed. Understanding the impact annealing has on dripping and burning rate can be important as several polymer processing techniques feature secondary processes where polymers are exposed to higher temperatures after primary production processes. These experimental results showed that annealing the samples reduced the delay to the time of the first drop (FIG. 9A). The normalized first drip times for the annealed PE/PP samples with 640 and 2560 layers were 14 and 16 s/mm, respectively, showing significant drops of 62% and 57%, compared to the corresponding unannealed samples with normalized first drip times of 36 and 37 s/mm. The normalized first drip times for the annealed specimens were close to the normalized first drip time of the PE/PP blends (11 s/mm).

Figure 9B:
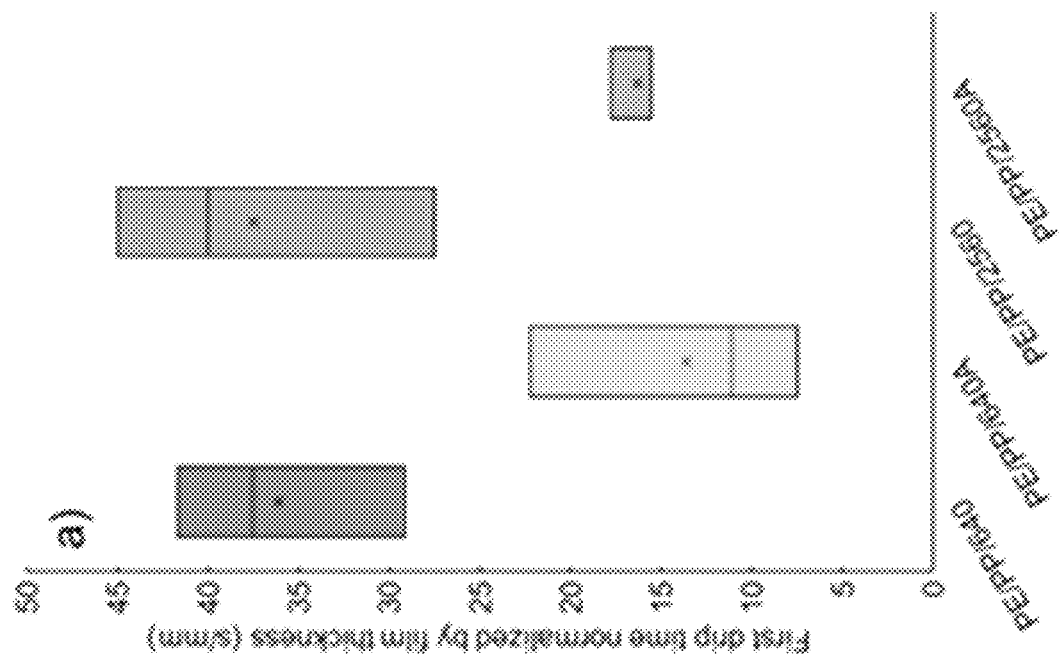
FIG. 9B is a graph showing a number of drips normalized by film thickness for layered samples of PE and PP with different numbers of layers (unannealed vs. annealed (A)).

FIG. 9B shows the number of drips for the annealed samples adjacent to their corresponding unannealed controls. The normalized drip numbers for the PE/PP multilayer films with 640 and 2560 layers after annealing were 330 and 610 drips/mm, respectively. These values represent increases of 71% and 412% compared to the values for their corresponding unannealed specimens (190 and 120 drips/mm). The measured values for the annealed samples had intermediate values between the data for the layered PE/PP samples and the PE/PP blends with the normalized drip number of 940 drips/mm. The change in the drip numbers was much more noticeable for the multilayer samples with 2560 layers compared to the samples with 640 layers.

To investigate the structural changes that might lead to the observed differences, TEM images of the samples in areas close to the combustion zone (shown in FIG. 1A) were obtained. This was done after burning the samples for 3-5 s then extinguishing the flame. Samples for TEM were cut 5-10 mm from the burned edge of the samples. TEM images of the layered samples after annealing were also captured. The images were in good agreement with the regularity of the layers shown in FIG. 4. Further, the thicknesses of layers, stacked from bottom left to top right, appeared to be somewhat thicker, which might be due to a reduced resolution by using unstained sample slices with weak electron density contrast.

The blend samples showed highly extended PE droplets. These were formed during mixing and stretching during the compression molding used to fabricate films. The morphology of the blend sample close to the combustion zone was also imaged and showed contraction and breakup of the extended PE phase in the PP matrix. This droplet retraction likely contributed to the reduction in the normalized number of drips for the blend samples compared to the pure PE and PP samples. Retraction appeared to have taken place due to interfacial tension acting on the droplets and recovery from molded-in stresses as temperatures increase above the melting points of the polymers during burning.

The morphology of a 640-layer sample close to the combustion zone was also imaged. The layers were thicker than other images, indicating retraction of the sample which delayed the onset of drips and reduced the number of drips. The reduction in normalized drip numbers can also be attributed to higher extensional viscosity. Jordan et al.[34] measured extensional viscosity on coextruded films of these same polymers. They found that the number of layers directly increased the extensional viscosity of PE/PP multilayers. Thus the 2560-layer sample is predicted to have even a higher extensional viscosity. In the area close to the combustion zone, layers of the 2560-layer sample, stacked from bottom right to top left, were thicker and had retracted enough to start breaking up. This combination of layer breakup (or coarsening) and increased extensional viscosity for the 2560-layer samples may have been the cause for the long time to first drip and the normalized drip numbers being even lower than for the 640-layer sample.

The morphology of the 640-layer and 2560-layer samples after annealing were also imaged. These images were similar to those taken close to the combustion zone. In a sense, the retraction during quiescent annealing "wastes" the potential to reduce dripping during burning and thus both samples show more dripping after annealing. The 2560-layer sample showed a bigger increase in drips/second over its original value due to the greater coarsening and drop breakup.

Fire Safety Map

There are a plethora of studies that have focused on the quantitative determination of burning rates for materials, but these investigations largely ignore the first drip time and overall drip numbers.[1,3,48,49] Many fire safety classifications are qualitative and only based on the ignition of materials and flammability of the drips, neglecting the contributions of first drip time and overall drip numbers to consumer safety.[25,50] There is a need for a method to select materials based on collective performance in fire tests. To accomplish this, a quantitative parameter called the "dripping index" (DI) was defined that combines the parameters of the first drip time and drip numbers into a general behavior. DI is defined as the ratio of the drip numbers per unit volume to the first drip time per film thickness, $$DI = \frac{\text{Drip number per unit volume}}{\text{First drip time per unit thickness}}$$

DI is a simple, yet practical and effective combined parameter that accounts for the severity of the dripping behavior. This definition also provides for ruling out the volume and thickness effects, making DI applicable to many fire testing standards and experiments. It provides for making comparisons of the flammability of the layered materials to standard polymers. As the dripping index increases, one might expect a higher number of drips and/or shorter times required for the first drip, both signaling enhanced fire spreading behavior. Lower values of DI are indicative of samples that feature fewer drips and/or a delayed drip time during the combustion process, meaning a lower propensity for fire spread. The dripping index along with the volumetric burning rates was then used to establish a map for fire safety of the studied materials with varying morphologies. This map, depicted in FIG. 10, can be used as a quantitative robust criterion for material selection, augmenting the current fire safety standards which ignore the number of drips and time to the first drip. The goal of the fire safety map is to select polymeric materials that lie in the lower left region and also do not generate toxic fumes in burning.

Figure 10:
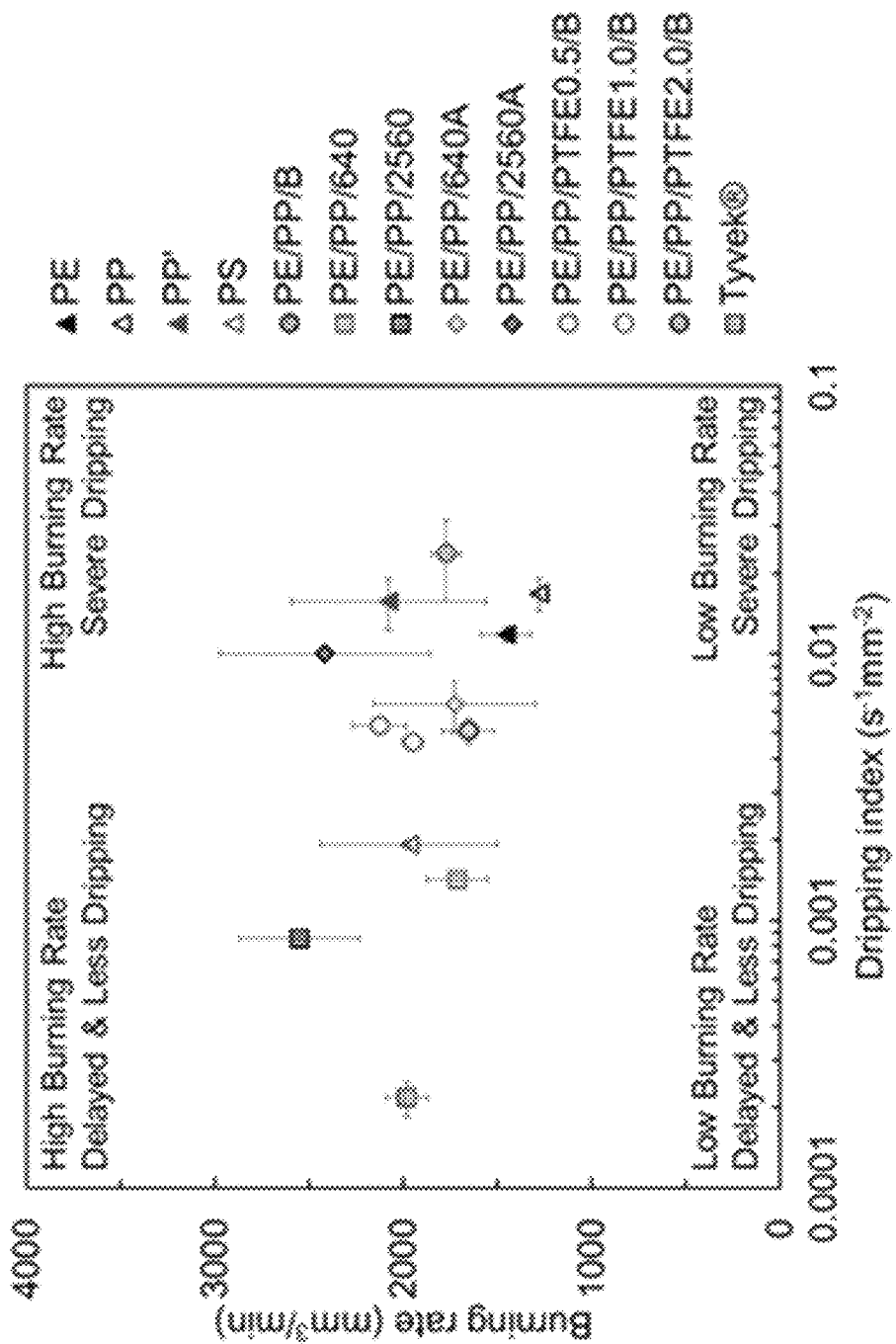
FIG. 10 is a fire safety map based on burning rate and dripping index for different morphologies and materials.

In FIG. 10, data for polystyrene (PS) is included, another grade of polypropylene (PP'), and commercially available home wrap (Tyvek®) to highlight the usefulness of the fire safety map in material selection. It is worth mentioning that Tyvek® is a nonwoven fabric, while all the other samples in this study (controls, blends, and layered) are continuous films. Also, some flame retardants are generally used to coat the surface of home wrap products and home wraps are significantly more expensive than films, even multilayer films. While PE and PP homopolymers have higher dripping indices, the dripping index shows more than one order of magnitude reduction for layered structures. This may be attributed to increased extensional viscosities and retraction processes leading to morphological changes in the layered structures. Unlike PE and PP films, PS had a lower dripping index due to soot formation in the combustion process. This demonstrates the effectiveness of the solid phase char-formation mechanism in insulating the burning zones from the rest of the polymeric material. Tyvek® shows lower values of DI, however, its burning rate is similar to all the other polymer films. Upon annealing, the integrity of layered structures changes due to coarsening and layer breakup. This led to the intermediate behavior of the annealed films between the corresponding films with layered structures and blends.

SEM AND TEM Microscopy

The morphology and the actual number of layers were determined using SEM and TEM. The coextruded multilayer PE/PP samples were cryo-microtomed at −120° C. with a glass knife to expose a smooth edge-on cross-section of the multilayer film. Each sample was cryo-microtomed at an angle so that the knife marks were distinguishable from the multilayer structure. The trimmed multilayer cross-section was exposed to vapors of a ruthenium tetroxide (RuO$_4$) solution for 30 min before being dried in a fume hood overnight. Additional trimming was performed by cryo-microtome at −120° C. with a glass knife to remove excess RuO$_4$ aggregates on the surface. Following the second trimming, 1.5 nm of iridium was sputter-coated (Leica EM ACE600) onto the cryo-microtomed surface to prevent charging during SEM (Hitachi SU8230) imaging. The SEM instrument was equipped with a cold field emission gun and the SEM images were obtained with an accelerating voltage of 25 kV. The multilayer structure was observed with a back-scattered electron detector (BSE) where the PE layers are distinguished as bright and dark domains. To span the entire sample at the resolution needed to measure layer thicknesses with sub-micron dimensions, six to nine separate high-magnification micrographs were manually stitched together. For TEM measurements, cross sections of the PE/PP films (thickness: ca. 70-100 nm) were prepared by cryomicrotoming at −140° C. using a Leica EM UC6 Ultramicrotome equipped with cryogenic chamber. A Diatome diamond knife was used to cut the slices that were transferred to TEM grids using saturated sucrose solution. A perfect loop (Electron Microscopy Sciences, Hatfield, PA) was also utilized. The images were obtained using a Tecnai G2 Spirit BioTwin microscope with an accelerating voltage of 120 kV. The TEM images for morphology change after burning or annealing were obtained with unstained samples (thickness: ca. 70-100 nm) microtomed at room temperature using a Leica EM UC7 Ultramicrotome. A Talos L120C TEM (accelerating voltage of 120 kV) was used.

Effect of PTFE Additive on Burning Rates

Figure 11:
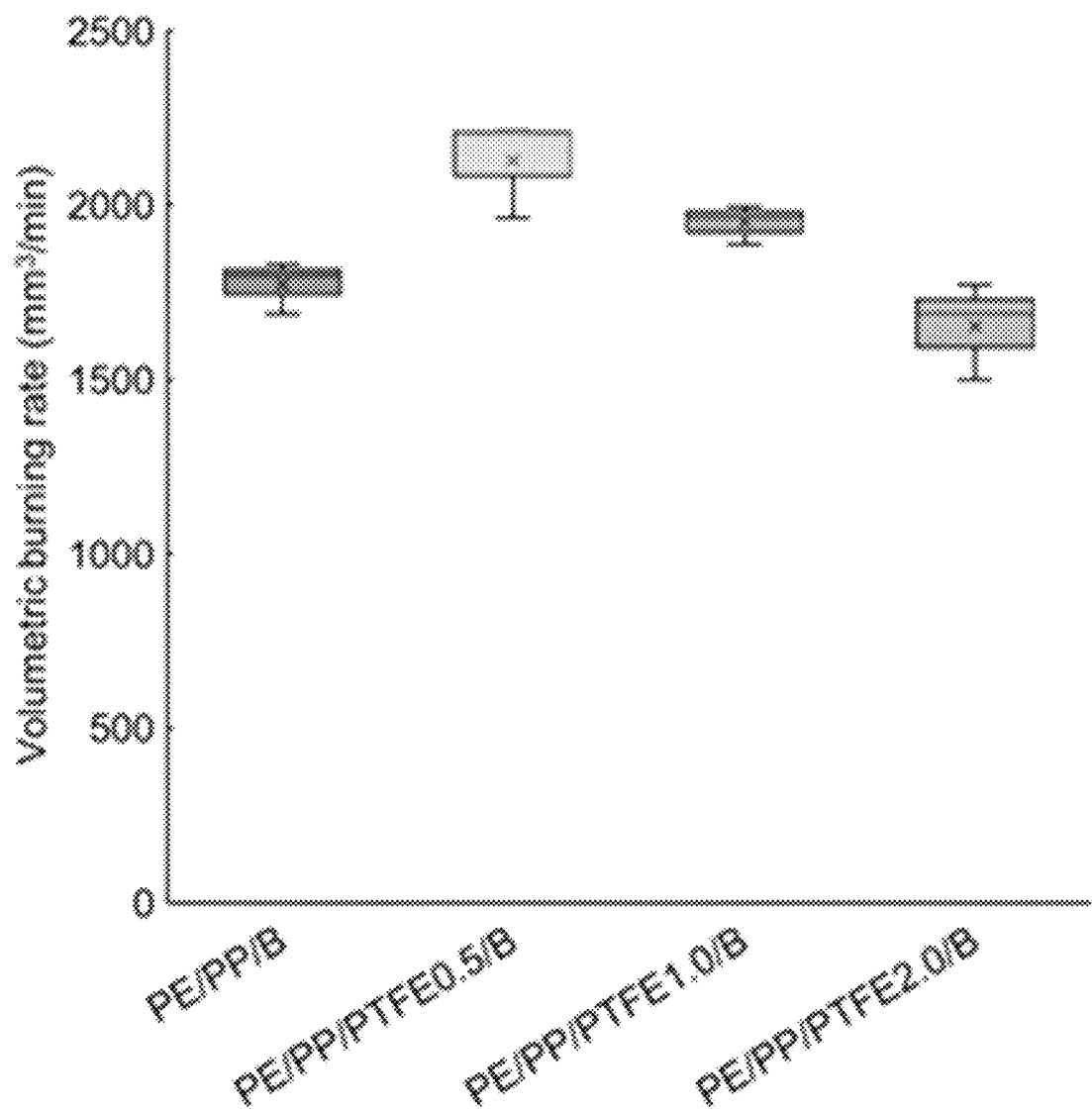
FIG. 11 is a graph showing volumetric burning rate for blends of PE and PP with different contents of PTFE.

FIG. 11 shows the burning rate for the PE/PP films with and without PTFE additives. The burning rate for films with 0.5% wt. PTFE was 2130 mm$^3$/min. This value shows a 20% increase compared to the burning rate of 1770 mm$^3$/min for the PE/PP blends with no PTFE. The burning rates for the samples containing 1% wt. and 2% wt. of PTFE additives are 1949 and 1650 mm$^3$/min, respectively. The PTFE filled samples showed no significant benefits for burning rates of samples.

Effect of Layered Structure on Burning Rates

Figure 12:
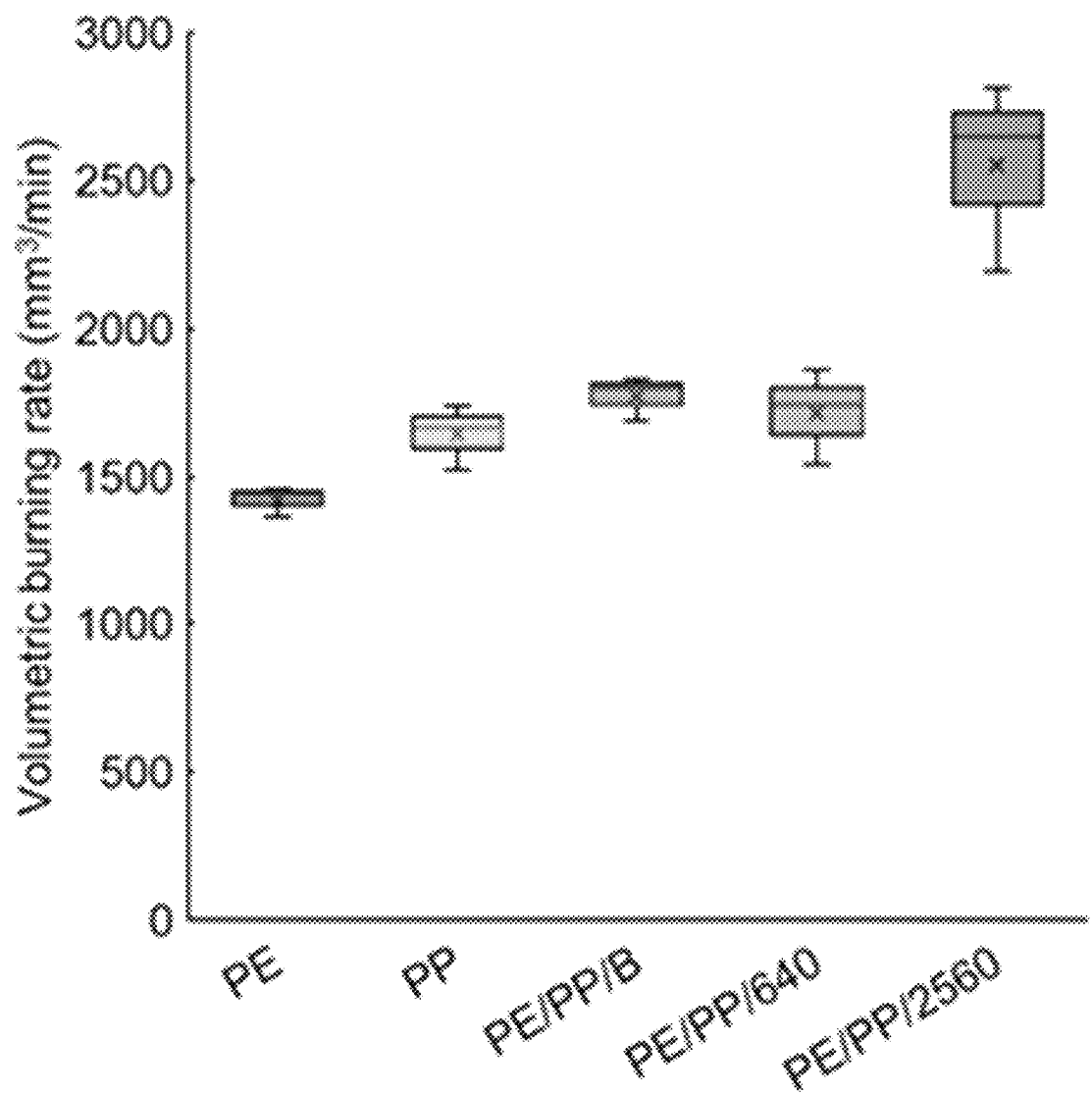
FIG. 12 is a graph showing volumetric burning rate for samples of PE and PP with different structures (blend and layered).

Although the multilayer structure showed a huge impact on dripping of PE and PP films, it showed no benefit in terms of burning rates. FIG. 12 illustrates the results for the volumetric burning rates in the PE/PP films for different morphologies. Melt blended PE/PP films show an increase in burning rate, 1770 mm$^3$/min, compared to the homopolymer samples of PE and PP, 1444 and 1640 mm$^3$/min, respectively. This is equal to 230 mm$^3$/min increase (slightly greater than the standard deviation for the PE and PP homopolymers in FIG. 7B) compared to the average value for two homopolymer samples, i.e. 1540 mm$^3$/min. The PE/PP films with 640 layers had burning rate values of 1720 mm$^3$/min, which is within experimental error for the average PE and PP burning rates. More noticeably was the burning rate for the specimens with 2560 layers, which is 2550 mm$^3$/min. This value is higher than the burning rates of the other morphologies. The increase in the burning rates can be associated with retraction of layered conformations due to the residual stresses present in the structure of the films. Retraction facilitates the upward movement of the specimen, and hence, the flame in the vertical direction, leading to faster burning rates[51,52]. The greater aspect ratio of the formed layers reveals greater retraction capability[53-55], contributing to higher burning rate values observed for the films with a higher number of layers. Also, this finding reveals the limitation of the UL94 standard that does not quantitatively describe the dripping behavior of samples. Based on the UL94 fire standard, the dripping behavior is defined based on the presence of dripping for specimens, and either the drips are flaming or not[56]. Without a quantitative measure, one might neglect the advantages of the layered structures in terms of dripping as one of the important fire safety parameters.

Figure 13:
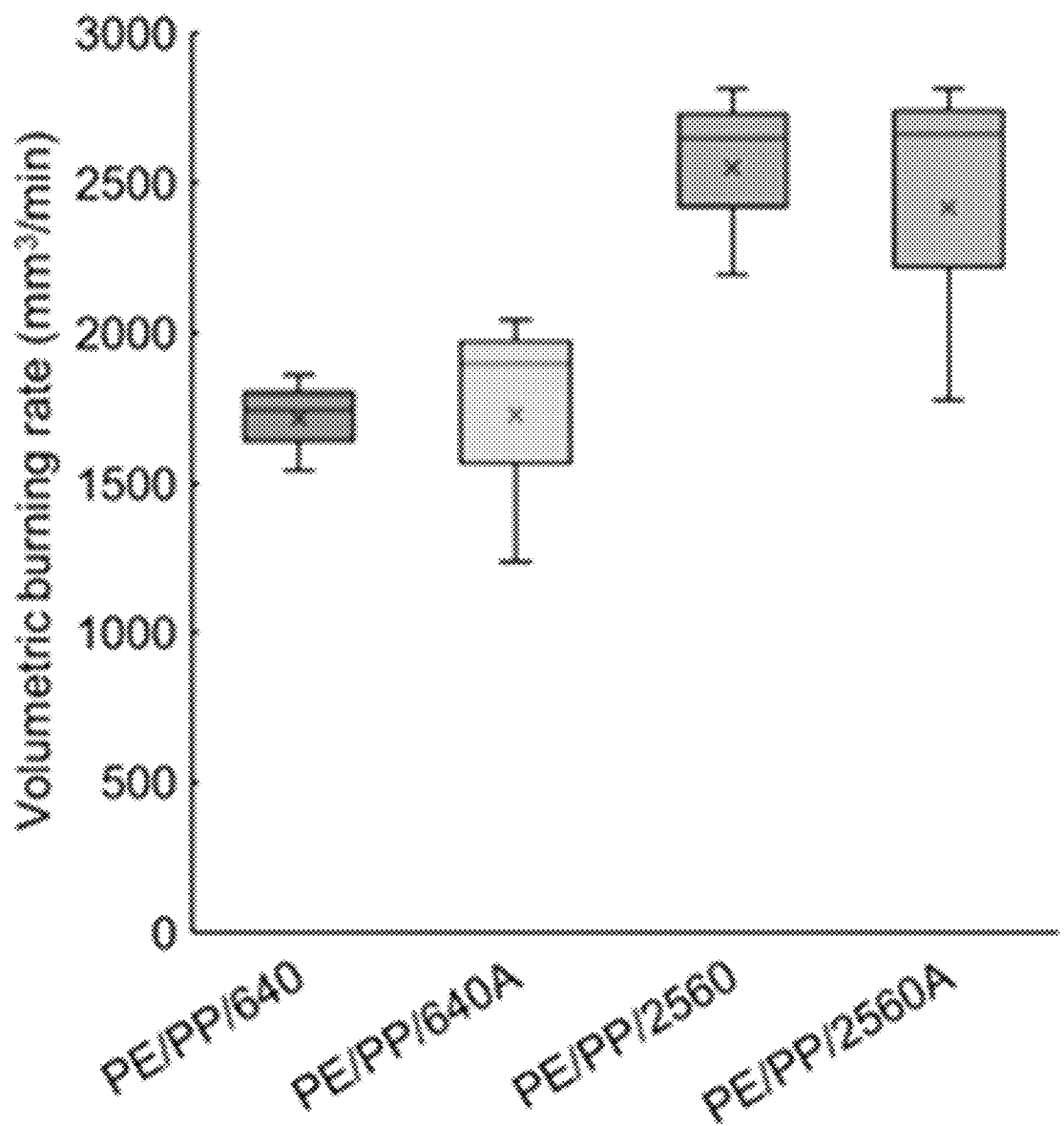
FIG. 13 is a graph showing volumetric burning rate for layered samples of PE and PP with different number of layers (unannealed vs. annealed).

FIG. 13 shows burning rates obtained for the multilayer films next to the values determined for the corresponding annealed samples. As shown, the burning rates of the samples did not show noticeable changes with annealing for 2 min at 180° C. It can be inferred that the retraction processes are still present for the annealed 2560 samples which facilitate the upward movement of the film and flame.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES (1) Schartel, B.; Wilkie, C. A.; Camino, G. Recommendations on the Scientific Approach to Polymer Flame Retardancy: Part 2-Concepts. Orig. Artic. J. Fire Sci. 2017, 35 (1), 3-20.
(2) Stoliarov, S. I.; Crowley, S.; Lyon, R. E.; Linteris, G. T. Prediction of the Burning Rates of Non-Charring Polymers. Combust. Flame 2009, 156 (5), 1068-1083.
(3) Leventon, I. T. Prediction of Upward Flame Spread over Polymers, University of Maryland, 2016.
(4) Matzen, M.; Kandola, B.; Huth, C.; Schartel, B. Influence of Flame Retardants on the Melt Dripping Behaviour of Thermoplastic Polymers. Materials (Basel). 2015, 8, 5621-5646.
(5) Przystas, A.; Jovic, M.; Salmeia, K. A.; Rentsch, D.; Ferry, L.; Mispreuve, H.; Perler, H.; Gaan, S. Some Key Factors Influencing the Flame Retardancy of EDA-DOPO Containing Flexible Polyurethane Foams. Polymers (Basel). 2018, 10, 1115.
(6) Kong, L.; Wang, Y.; Yu, H.; Liu, B.; Qi, S.; Wu, D.; Zhong, W. H.; Tian, G.; Wang, J. In Situ Armoring: A Robust, High-Wettability, and Fire-Resistant Hybrid Separator for Advanced and Safe Batteries. ACS Appl. Mater. Interfaces 2019, 11 (3), 2978-2988.
(7) Illeperuma, W. R. K.; Rothemund, P.; Suo, Z.; Vlassak, J. J. Fire-Resistant Hydrogel-Fabric Laminates: A Simple Concept That May Save Lives. ACS Appl. Mater. Interfaces 2016, 8 (3), 2071-2077.
(8) Lu, D. R.; Xiao, C. M.; Xu, S. J. Starch-Based Completely Biodegradable Polymer Materials. Express Polym. Lett. 2009, 3 (6), 366-375.
(9) Karamikamkar, S.; Fashandi, M.; Naguib, H. E.; Park, C. B. In-Situ Interface Design in Graphene-Embedded Polymeric Silica Aerogel with Organic/Inorganic Hybridization. ACS Appl. Mater. Interfaces 2020.
(10) Kandola, B. K.; Ndiaye, M.; Price, D. Quantification of Polymer Degradation during Melt Dripping of Thermoplastic Polymers. Polym. Degrad. Stab. 2014, 106, 16-25.

(11) Emergency and Emergency Evacuation Duties. Code of Federal Regulations, Title 14, Pt. 121.397.; Washington, D.C.: U.S. Government Printing Office, 1985.

(12) Chatterjee, S.; Shanmuganathan, K.; Kumaraswamy, G. Fire-Retardant, Self-Extinguishing Inorganic/Polymer Composite Memory Foams. ACS Appl. Mater. Interfaces 2017, 9 (51), 44864-44872.

(13) Naik, A. D.; Bourbigot, S.; Bellayer, S.; Touati, N.; Ben Tayeb, K.; Vezin, H.; Fontaine, G. Salen Complexes as Fire Protective Agents for Thermoplastic Polyurethane: Deep Electron Paramagnetic Resonance Spectroscopy Investigation. ACS Appl. Mater. Interfaces 10 2018, (29), 24860-24875.

(14) Chu, F.; Hou, Y.; Liu, L.; Qiu, S.; Cai, W.; Xu, Z.; Song, L.; Hu, W. Hierarchical Structure: An Effective Strategy to Enhance the Mechanical Performance and Fire Safety of Unsaturated Polyester Resin. ACS Appl. Mater. Interfaces 2019.

(15) Wei, Y. X.; Deng, C.; Chen, H.; Wan, L.; Wei, W. C.; Wang, Y. Z. Novel Core-Shell Hybrid Nanosphere towards the Mechanical Enhancement and Fire Retardance of Polycarbonate. ACS Appl. Mater. Interfaces 2018, 10 (33), 28036-28050.

(16) Shang, K.; Yang, J. C.; Cao, Z. J.; Liao, W.; Wang, Y. Z.; Schiraldi, D. A. Novel Polymer Aerogel toward High Dimensional Stability, Mechanical Property, and Fire Safety. ACS Appl. Mater. Interfaces 2017, 9 (27), 22985-22993.

(17) Hou, Y.; Liu, L.; Qiu, S.; Zhou, X.; Gui, Z.; Hu, Y. DOPO-Modified Two-Dimensional Co-Based Metal-Organic Framework: Preparation and Application for Enhancing Fire Safety of Poly(Lactic Acid). ACS Appl. Mater. Interfaces 2018, 10 (9), 8274-8286.

(18) Amran Bin Md Ali, M.; Nobukawa, S.; Yamaguchi, M. Morphology Development of Polytetrafluoroethylene in a Polypropylene Melt. Pure Appl. Chem 2011, 83 (10), 1819-1830.

(19) Huang, A.; Peng, X.; Turng, L.-S. In-Situ Fibrillated Polytetrafluoroethylene (PTFE) in Thermoplastic Polyurethane (TPU) via Melt Blending: Effect on Rheological Behavior, Mechanical Properties, and Microcellular Foamability. Polymer (Guildf). 2018, 134, 263-274.

(20) Zhao, J.; Wang, G.; Zhao, Q.; Park, C. B. Development of High Thermal Insulation Polypropylene Foams Blown in Injection Molding with Mold Opening. In SPE Antec; Anaheim, 2017.

(21) Awaja, F.; Pavel, D. Recycling of PET. Eur. Polym. J. 2005, 41 (7), 1453-1477.

(22) Cobian-Iniguez, J.; Aminfar, A.; Weise, D. R.; Princevac, M. On the Use of Semi-Empirical Flame Models for Spreading Chaparral Crown Fire. Front. Mech. Eng. 2019, 5 (August), 1-13.

(23) Younis, A. A. Evaluation of the Flammability and Thermal Properties of a New Flame Retardant Coating Applied on Polyester Fabric. Egypt. J. Pet. 2016, 25 (2), 161-169.

(24) Shimizu, T.; Hamada, O.; Sasaki, A.; Ikeda, M. Polymer Fume Fever. BMJ Case Rep. 2012, 2012.

(25) Levchik, S. V; Weil, E. D. Flame Retardants in Commercial Use or in Advanced Development in Polycarbonates and Polycarbonate Blends. J. FIRE Sci. 2006, 24.

(26) Dhanumalayan, E.; Joshi, G. M. Performance Properties and Applications of Polytetrafluoroethylene (PTFE)—a Review. Adv. Compos. Hybrid Mater. 2018, 1, 247-268.

(27) Ghanbari, A.; Heuzey, M.-C.; Carreau, P. J.; Ton-That, M.-T. Morphological and Rheological Properties of PET/Clay Nanocomposites. Rheol. Acta 2013, 52 (1), 59-74.

(28) Kashiwagi, T.; Mu, M.; Winey, K.; Cipriano, B.; Raghavan, S. R.; Pack, S.; Rafailovich, M.; Yang, Y.; Grulke, E.; Shields, J.; Harris, R.; Douglas, J. Relation between the Viscoelastic and Flammability Properties of Polymer Nanocomposites. Polymer (Guildf). 2008, 49 (20), 4358-4368.

(29) Liu, M.; Zhang, X.; Zammarano, M.; Gilman, J. W.; Davis, R. D.; Kashiwagi, T. Effect of Montmorillonite Dispersion on Flammability Properties of Poly(Styrene-Co-Acrylonitrile) Nanocomposites. Polymer (Guildf). 2011, 52 (14), 3092-3103.

(30) Ghanbari, A.; Behzadfar, E.; Arjmand, M. Properties of Talc Filled Reactor-Made Thermoplastic Polyolefin Composites. J. Polym. Res. 2019, 26 (10), 241.

(31) Gholami, F.; Pakzad, L.; Behzadfar, E. Morphological, Interfacial and Rheological Properties in Multilayer Polymers: A Review. Polymer. 2020.

(32) Zheng, J.; Suh, S. Strategies to Reduce the Global Carbon Footprint of Plastics. Nat. Clim. Chang. 2019, 9 (5), 374-378.

(33) Jordan, A. M.; Kim, K.; Soetrisno, D.; Hannah, J.; Bates, F. S.; Jaffer, S. A.; Lhost, O.; Macosko, C. W. Role of Crystallization on Polyolefin Interfaces: An Improved Outlook for Polyolefin Blends. Macromolecules 2018, 51 (7), 2506-2516.

(34) Jordan, A. M.; Lee, B.; Kim, K.; Ludtke, E.; Lhost, O.; Jaffer, S. A.; Bates, F. S.; Macosko, C. W. Rheology of Polymer Multilayers: Slip in Shear, Hardening in Extension. J. Rheol. (N. Y. N. Y). 2019, 63 (5), 751-761.

(35) Beyler, C. L.; Hunt, S. P.; Iqbal, N.; Williams, F. W. A Computer Model of Upward Flame Spread on Vertical Surfaces. In Fire Safety Science—Proceeding of the Fifth International Symposium; 1997; pp 297-308.

(36) De Ris, J. N. Spread of a Laminar Diffusion Flame. Symp. Combust. 1969, 12 (1), 241-252.

(37) Brandrup, J.; Immergut, E. H.; Grulke, E. A.; Abe, A.; Bloch, D. R. Polymer Handbook (4th Edition); John Wiley & Sons, Ltd: New York N. Y., 2005.

(38) Johnston, C. J.; Finkelstein, J. N.; Mercer, P.; Corson, N.; Gelein, R.; Oberdorster, G. Pulmonary Effects Induced by Ultrafine PTFE Particles. 2000.

(39) Wang, X.; Wu, J.; Zhou, L.; Wei, X.; Wang, W. Tribological Behaviors of Amino Functionalized Graphene Reinforced PTFE Composite. Proc. Inst. Mech. Eng. Part J J. Eng. Tribol. 2018, 232 (11), 1428-1436.

(40) Kempel, F.; Schartel, B.; Marti, J. M.; Butler, K. M.; Rossi, R.; Idelsohn, S. R.; Oñate, E.; Hofmann, A. Modelling the Vertical UL 94 Test: Competition and Collaboration between Melt Dripping, Gasification and Combustion. Fire Mater. 2015, 39, 570-584.

(41) Ansari, M.; Behzadfar, E.; Atsbha, H.; Karsch, U.; Hatzikiriakos, S. G. Extrudate Swell of HDPE Melts with Application to Manufacturing of the New Generation Fuel System (NGFS®). In SPE Antec; 2015.

(42) López-Barrón, C. R.; Macosko, C. W. Rheological and Morphological Study of Cocontinuous Polymer Blends during Coarsening. J. Rheol. (N. Y. N. Y). 2012, 56, 1315.

(43) Christiansen, H.; Majumder, S.; Janke, W. Coarsening and Aging of Lattice Polymers: Influence of Bond Fluctuations. J. Chem. Phys. 2017, 147, 94902.

(44) Behzadfar, E.; Ansari, M.; Konaganti, V. K.; Hatzikiriakos, S. G. Extrudate Swell of HDPE Melts: I. Experimental. J. Nonnewton. Fluid Mech. 2015, 225, 86-93.

(45) Konaganti, V. K. K.; Behzadfar, E.; Ansari, M.; Mitsoulis, E.; Hatzikiriakos, S. G. G. Extrudate Swell of High Density Polyethylenes in Slit (Flat) Dies. Int. Polym. Process. 2016, 31 (2), 262-272.

(46) Konaganti, V. K.; Behzadfar, E.; Kwak, R.; Mitsoulis, E.; Hatzikiriakos, S. G. Transient Swell of a High Density Polyethylene Using Adjustable Gap Slit Die. Int. Polym. Process. 2017, 32 (5), 574-581.

(47) Lopez-Barron, C. R.; Macosko, C. W. A New Model for the Coarsening of Cocontinuous Morphologies Particle Stabilised Emulsions Studied by WETSEM Technique A New Model for the Coarsening of Cocontinuous Morphologies. Soft Matter 2010, 6, 2637-2647.

(48) Kouini, B.; Serier, A. Combustion Behavior of Polypropylene/Polyamide66/Clay Nanocomposites. J. Vinyl Addit. Technol. 2017, 23, E68-E71.

(49) Younis, A. A. Flammability Properties of Polypropylene Containing Montmorillonite and Some of Silicon Compounds. Egypt. J. Pet. 2017, 26 (1), 1-7.

(50) UL 94, Standard for Safety for Tests for Flammability of Plastic Materials for Parts in Devices and Appliances; 2013.

(51) Feng, J.-M.; Liu, X.-Q.; Bao, R.-Y.; Yang, W.; Xie, B.-H.; Yang, M.-B. Suppressing Phase Coarsening in Immiscible Polymer Blends Using Nano-Silica Particles Interface. Located at the Rsc Adv. 2015, 5, 74295.

(52) López-Barrón, C. R.; Macosko, C. W. Rheological and Morphological Study of Cocontinuous Polymer Blends during Coarsening. Cit. J. Rheol. 2012, 56, 1315.

(53) Sundararaj, U.; Macosko, C. W. Drop Breakup and Coalescence in Polymer Blends: The Effects of Concentration and Compatibilizationt. Macromolecules 1995, 28, 2647-2657.

(54) Taylor, G. I. The Formation of Emulsions in Definable Fields of Flow. Proc. R. Soc. A Math. Phys. Eng. Sci. 1934, 146 (858), 501-523.

(55) Taylor, G. I. The Viscosity of a Fluid Containing Small Drops of Another Fluid. Proc. R. Soc. A Math. Phys. Eng. Sci. 1932, 138 (834), 41-48.

(56) *UL 94, Standard for Safety for Tests for Flammability of Plastic Materials for Parts in Devices and Appliances;* 2013.

What is claimed is:

1. A multilayer composite material comprising:
a plurality of first layers, each first layer comprising a first polymer; and
a plurality of second layers, each second layer comprising a second polymer, the plurality of first layers and the plurality of second layers being arranged in a repeating sequence of alternating first layers and second layers within the multilayer composite material;
wherein
the multilayer composite material has reduced dripping and a delayed first dripping time as the multilayer composite material undergoes a combustion process relative to a multilayer composite material having a single layer comprising the first polymer or the second polymer having a same thickness as a thickness of the multilayer composite material;
the first polymer is a low-density polyethylene-based polymer and the second polymer is a polypropylene-based polymer;
the repeating sequence of alternating first layers and second layers includes between 20 and 2560 uninterrupted alternating first layers and second layers; and
wherein the thickness of each layer of the multilayer composite material is in a range of about 10 nm to about 0.1 mm.

2. The multilayer composite material of claim 1, wherein the repeating sequence of alternating first layers and second layers includes between 512 layers and 2560 layers.

3. The multilayer composite material of claim 1, wherein the repeating sequence of alternating first layers and second layers includes between 512 layers and 1280 layers.

4. The multilayer composite material of claim 1, further comprising a third layer comprising a third polymer, the third polymer being different than the first polymer and the second polymer.

5. The multilayer composite material of claim 4, further comprising a fourth layer comprising a fourth polymer, the fourth polymer being different than the first polymer, the second polymer and the third polymer.

6. The multilayer composite material of claim 1, wherein the first layer and the second layer have a same thickness.

7. The multilayer composite material of claim 1, wherein the first layer and the second layer have a different thickness.

8. The multilayer composite material of claim 1, wherein the thickness of the multilayer composite material is in a range of about 0.1 mm to about 3 mm.

9. The multilayer composite material of claim 1, wherein the thickness of each layer of the multilayer composite material is in a range of about 40 nm to about 0.01 mm.

10. The multilayer composite material of claim 1, wherein the multilayer composite material has a drip time in a range of about 30 to about 40 s/mm or of about 36 s/mm.

11. The multilayer composite material of claim 1, wherein the multilayer composite material has a normalized number of drips in a range of about 100 drips/mm to about 250 drips/mm, or of about 190 drips/mm, or of about 120 drips/mm.

12. The multilayer composite material of claim 1, wherein the first layer and the second layer are arranged to provide for the multilayer composite material to have an increased extensional viscosity relative to a single layer of the polypropylene-based polymer having a same thickness as the thickness of the multilayer composite material.

13. The multilayer composite material of claim 1, wherein the first layer and the second layer are arranged to provide for an increased interfacial tension as a temperature of the multilayer composite material increases during the combustion process relative to a single layer having the same thickness as the thickness of the multilayer composite material.

14. A multilayer composite material comprising:
a plurality of first layers, each first layer comprising a first polymer; and
a plurality of second layers, each second layer comprising a second polymer, the plurality of first layers and the plurality of second layers being arranged in a repeating sequence of alternating first layers and second layers within the multilayer composite material;
wherein
each first layer and each second layer within the repeating sequence has a thickness in a range of about 10 nm to about 3 mm;
the multilayer composite material has reduced dripping and a delayed first dripping time as the multilayer composite material undergoes a combustion process relative to a multilayer composite material having a single layer comprising the first polymer or the second polymer having a same thickness as a thickness of the multilayer composite material;

the first polymer is a low-density polyethylene-based polymer and the second polymer is a polypropylene-based polymer;

the repeating sequence of alternating first layers and second layers includes between 20 and 2560 uninterrupted alternating first layers and second layers; and the first layer and the second layer have a different thickness.

15. The multilayer composite material of claim 14, wherein the repeating sequence of alternating first layers and second layers includes between 512 layers and 2560 layers.

16. The multilayer composite material of claim 14, wherein the repeating sequence of alternating first layers and second layers includes between 512 layers and 1280 layers.

17. The multilayer composite material of claim 14, wherein the thickness of the multilayer composite material is in a range of about 0.1 mm to about 3 mm.

18. The multilayer composite material of claim 14, wherein the thickness of each layer of the multilayer composite material is in a range of about 40 nm to about 0.01 mm.

19. The multilayer composite material of claim 14, wherein the first layer and the second layer are arranged to provide for the multilayer composite material to have an increased extensional viscosity relative to a single layer of the polypropylene-based polymer having a same thickness as the thickness of the multilayer composite material.

20. The multilayer composite material of claim 14, wherein the first layer and the second layer are arranged to provide for an increased interfacial tension as a temperature of the multilayer composite material increases during the combustion process relative to a single layer having the same thickness as the thickness of the multilayer composite material.

* * * * *